United States Patent [19]

Arakawa et al.

[11] Patent Number: 4,700,302

[45] Date of Patent: Oct. 13, 1987

[54] AUTOMATIC GUIDANCE SYSTEM FOR AN UNMANNED VEHICLE

[75] Inventors: Hideo Arakawa; Gunji Sugiyama; Koichi Tange; Takero Hongo; Yuzo Yamamoto; Hiroyuki Ohba, all of Aichi, Japan

[73] Assignee: Kabushiki Kaisha Toyota Chuo Kenkyusho, Aichi, Japan

[21] Appl. No.: 673,574

[22] Filed: Nov. 21, 1984

[30] Foreign Application Priority Data

Nov. 24, 1983 [JP] Japan ............................. 58-219598

[51] Int. Cl.$^4$ ............................................. G06F 15/50
[52] U.S. Cl. ................................... 364/424; 364/449; 364/427; 180/168
[58] Field of Search ................ 364/443, 453, 424, 436, 364/447, 449, 513; 180/167, 168, 169; 318/587

[56] References Cited

U.S. PATENT DOCUMENTS

| | | | |
|---|---|---|---|
| 3,715,572 | 2/1973 | Bennett | 364/460 |
| 4,309,758 | 1/1982 | Halsall et al. | 364/424 |
| 4,437,533 | 3/1984 | Bierkarre et al. | 318/587 X |
| 4,500,970 | 2/1985 | Daemmer | 364/513 |
| 4,541,060 | 9/1985 | Kogawa | 364/513 |
| 4,556,940 | 12/1985 | Katoo et al. | 364/424 |

Primary Examiner—Gary Chin
Assistant Examiner—Thomas G. Black

[57] ABSTRACT

An automatic guidance system for an unmanned vehicle causes the unmanned vehicle to move to a destination by a combination of traveling along a preset course, and turning and stopping at predetermined positions. A running control unit is provided to determine optimal control values in such a manner that a running state of the unmanned vehicle after a predetermined period of time is predicted by changing control values set in a drive unit in accordance with state values (e.g., position information and heading angle information) representing the current running state, and that the running state after the predetermined period of time matches with the directed operation of the unmanned vehicle, thereby accurately guiding the unmanned vehicle along the preset path.

20 Claims, 22 Drawing Figures

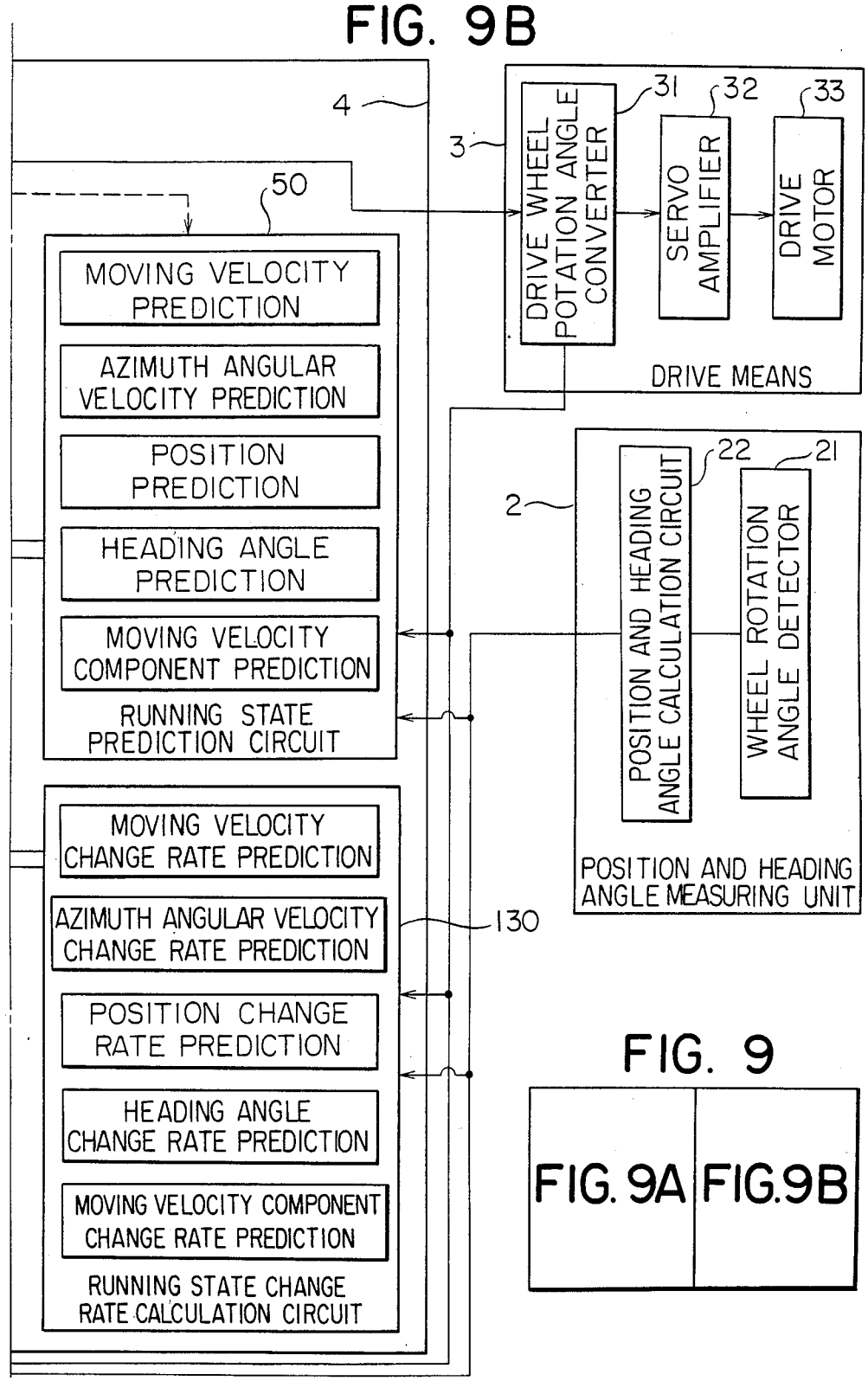

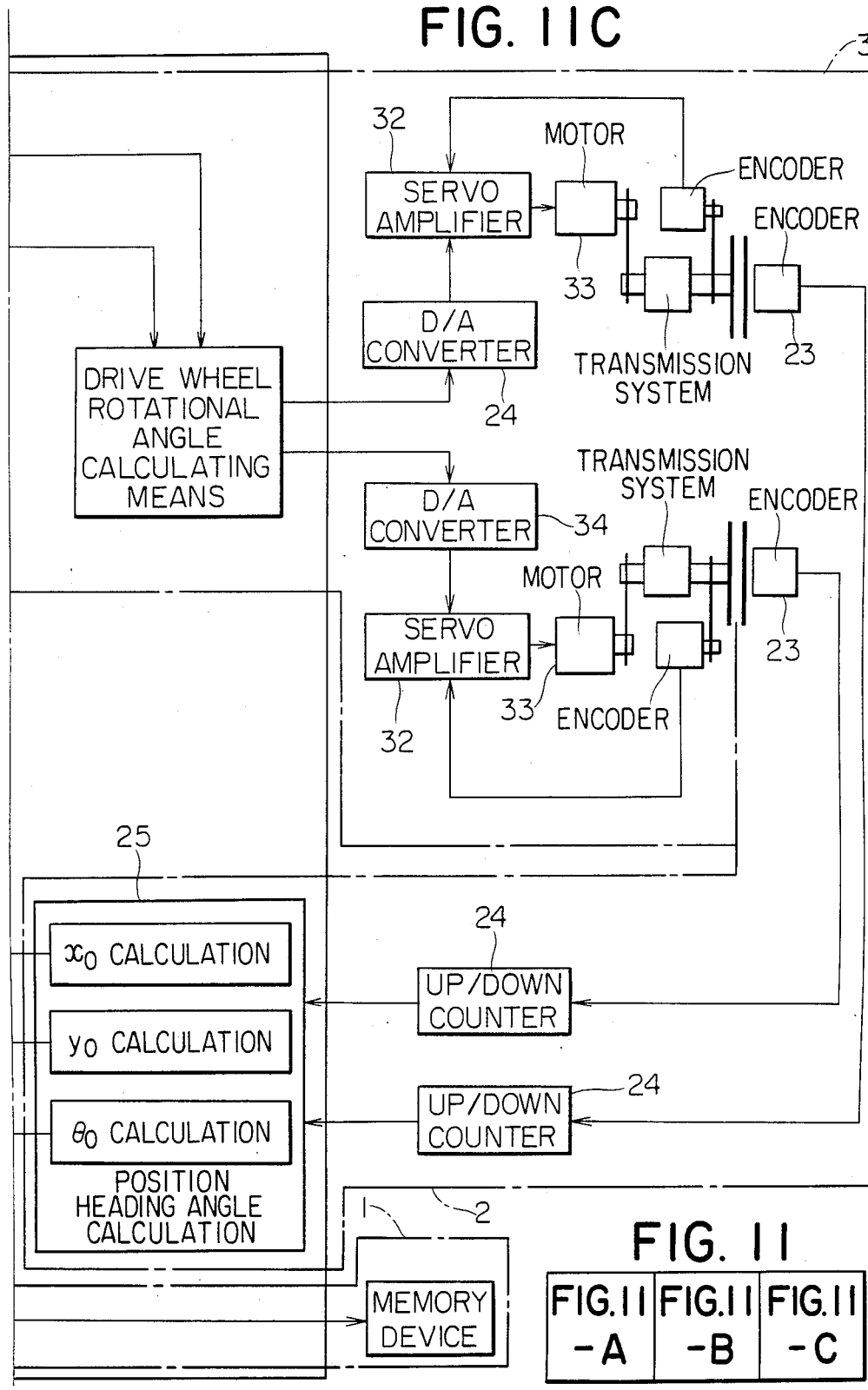

| FIG. 15A | FIG. 15B |

AUTOMATIC GUIDANCE SYSTEM FOR AN UNMANNED VEHICLE

BACKGROUND OF THE INVENTION

I. Field of the Invention

The present invention relates to an automatic guidance system for an unmanned vehicle wherein the unmanned vehicle travels along a course without guide members to a destination.

II. Description of the Prior Art

Several conventional unmanned vehicles traveling along a course without guide rails have been proposed. In these unmanned vehicles, an angular velocity of the running vehicle is detected by a gyro or a rotational angle of a wheel for causing the vehicle to travel along a running path. A position error of the vehicle with respect to the moving path is calculated. The vehicle is then automatically steered to correct the position error.

There are two types of conventional automatic guidance systems for an unmanned vehicle. In a first conventional automatic guidance system, a position error is directly calculated in accordance with information such as the rotational angle of the vehicle wheel or the angular velocity detected by a gyro, and the position error is corrected. In a second conventional automatic guidance system, the actual position and heading angle of an unmanned vehicle are measured and are compared with those for a predetermined path, and the actual position error is calculated and corrected.

According to the first automatic guidance system, driving means control values such as a steering angle or azimuth angular velocity to be given to the unmanned vehicle in accordance with a moving distance are stored in a memory means as path information for automatically driving the unmanned vehicle. By referring to the storage contents of the memory means in accordance with a distance calculated by a rotational angle of the wheel, the readout steering angle or azimuth angular velocity is supplied to the driving means, so that the driving means is driven in accordance with these pieces of information. At the same time, the detected azimuth angular velocity information is subtracted from the readout steering angle or azimuth angular velocity information to calculate a position error. A correction signal for correcting the position error is calculated in accordance with a predetermined mathematical expression and is superposed on the readout values. The resultant information corrects the position error so that the unmanned vehicle can be automatically driven.

According to this automatic guidance system, the steering angle and azimuth angular velocity (i.e., a steering value) which correspond to a moving distance are stored as motion data in the memory means, and the memory means must be mounted in the unmanned vehicle. However, when a complicated course is included in a course network having many intersections, the necessary steering value information for the unmanned vehicle must be prepared for all moving courses, so that a great amount of data having high redundancy must be used. Therefore, the memory cannot be effectively used, resulting in inconvenience. In addition to this disadvantage, it is laborious to create these data. Therefore, the first conventional automatic guidance system can be applied only to a relatively simple moving course.

Furthermore, when a preset moving course is partially modified to obtain another moving course, a moving distance up to a point where the course is modified must be calculated, and all steering values for the remaining distance must be modified in accordance with the modified course. In practice, it is difficult to process such a great amount of data in a short period of time. This conventional system cannot be applied to a flexible unmanned vehicle which changes its moving course in accordance with surrounding conditions.

According to this conventional automatic guidance system, correction of the position error is performed in accordance with a difference between the preset azimuth angular velocity and the detected azimuth angular velocity or between the preset steering angle and the detected steering angle. The position error at the initial period of travel of the unmanned vehicle cannot be corrected, and changes in moving distance up to the destination are caused by zig-zag motion and cannot be corrected. Then, guidance becomes inaccurate in principle. In addition to this disadvantage, the position error representing a deviation from the moving path cannot be predicted for correction before the position error occurs. The correction of the position error is delayed, thus disabling preventing stable motion.

In view of the drawbacks of the first conventional automatic guidance system for controlling the vehicle motion in accordance with steering value information, the second conventional automatic guidance system has been proposed. According to this system, the position and the heading angle of the unmanned vehicle are calculated once in accordance with rotational angle information of the wheel or the like, and the vehicle is controlled in accordance with this information. A dot array represented by a coordinate system and plotted on a road surface is stored as moving path data of the unmanned vehicle. A moving course represented by a line obtained such that dots are connected with reference to the dot array is compared with the calculated position and heading angle information. When the vehicle is located to the left of the course, the vehicle is driven to the right. However, when the vehicle is located to the right of the course, the vehicle is driven to the left. As a result, the vehicle is driven along the course. According to this system, the position error of the vehicle can be corrected from the very beginning of travel. The motion data is not given by the moving distance but by the position and the heading angle. Even if the vehicle is driven in a zig-zag manner, the vehicle can be accurately guided to the destination. However, in order to cause the unmanned vehicle to accurately travel along a curved path, dot array data is increased and a memory having a large capacity is required. According to this automatic guidance system, the moving speed information can be used in addition to the position information and the heading angle information so as to predict a position error representing a deviation from the path in the near future. Therefore, position error correction is performed at a prediction point prior to actual occurrence of the position error, and more stable control can be achieved. However, it is very difficult to calculate a control value for correcting the position error. When the vehicle greatly deviates from the path in the system wherein the control value is set in the driving means, the vehicle is kept steered to the right or left and traces a circular locus and cannot return to the proper course. In addition, in a right-angled path, special operations are required. The deviation from the path is controlled independently of the moving speed, so the vehicle turns a right-angled corner with a larger radius of curvature, resulting in inconvenience. While the unmanned vehicle is being guided, the vehicle is inevitably stopped. However, it is very difficult to stop the vehicle in accordance with the conventional control operation of the deviation from the path performed independently of the moving speed. Even the second conventional automatic guidance system still remains in the experimental stage.

According to the conventional techniques for guiding an unmanned vehicle driven along a course without guide rails or the like, a memory device for storing a great amount of data must be mounted in the unmanned vehicle to cause the vehicle to travel a complicated course network. The system as a whole becomes expensive, and the vehicle cannot be stopped at a destination. A practical model has not yet been developed.

SUMMARY OF THE INVENTION

The present invention is directed to an improvement of the conventional automatic guidance system for measuring the position and the heading angle and for comparing them with a preset path.

It is a first object of the present invention to provide an automatic guidance system for an unmanned vehicle, wherein state values after a predetermined period are predicted in accordance with control values set in a drive unit and state values representing the moving state, such as position and heading angle of the unmanned vehicle, and the control values are set such that the moving state values to be predicted in the near future correspond to the preset operation of the unmanned vehicle, so that the vehicle can be driven accurately along the preset path as compared with a conventional guidance system for an unmanned vehicle, and, highly reliable guidance control is performed to guide the unmanned vehicle according to any moving state along any path, thereby providing flexibility for changing moving state values.

It is a second object of the present invention to provide an automatic guidance system for an unmanned vehicle, wherein an evaluation function (i.e., moving errors including a position error representing a deviation of the unmanned vehicle from a path, a velocity error and so on) is solely determined in accordance with the predicted moving state values and the preset operation, and control values for minimizing the evaluation function are calculated, so that the position of the moving vehicle is controlled together with its velocity, thereby providing highly precise positioning such as stopping.

It is a third object of the present invention to provide an automatic guidance system for an unmanned vehicle, wherein a simple operation unit is mounted in the unmanned vehicle to provide a high precision motion control function in such a manner that when a control value changes, the change rate (e.g., a correction effect of moving errors) of the predicted evaluation function is known, and the control value is set in accordance with the change rate, thereby effectively calculating the control value so as to have a predicted minimum error value.

According to the present invention, there is provided an automatic guidance system for an unmanned vehicle so as to guide the unmanned vehicle to a destination by combining an operation, such as running along a preset course, turning and stopping at a predetermined point, comprising: running command means for generating operation or running data which determines operation of the unmanned vehicle; position and heading angle measuring means for detecting current running state values such as a position and a heading angle of the unmanned vehicle and generating running state data; driving means for running and turning an unmanned vehicle; and running controlling means having running state value predicting means, connected to said position and heading angle measuring means, for calculating state values representing the running state including at least a running position after a predetermined period of time in accordance with a relationship between a control value and a drive value such as running and turning, which is determined by the driving means, and a relationship between the drive value and changes in the position and the heading angle of the unmanned vehicle when a given control value is set in said driving means, and control value calculating means, connected to said running state predicting means and said runnning command means and said driving means, for calculating the control value set in said driving means in accordance with the operation or running data and the predicted state value of the unmanned vehicle, whereby the unmanned vehicle is guided along an accurately preset running path.

According to one aspect of the present invention, said running controlling means comprises evaluation function calculating means for calculating an evaluation function value by using the operation or running data as parameters which represent the operation and which are given from said running command means and the predicted running state values from said running state predicting means in accordance with the evaluation function solely determined in accordance with the state values representing the running state and the parameters, said evaluation function calculating means being arranged to numerically evaluate whether or not the running state predicted by said running state predicting means corresponds to a state designated by said running command means.

According to another aspect of the present invention, the evaluation function preset in said evaluation function calculating means comprises a running error including a position error representing a deviation of the unmanned vehicle from the preset path, the position error being obtained from the state values representing the running state and the parameters representing the operation.

According to still another aspect of the present invention, the control value calculating means comprises assumed control value generating means for generating a plurality of assumed control values, evaluation value comparing means for comparing state values with evaluation function values from said evaluation function calculating means, the evaluation function values being given for the state values representing the running states after a predetermined period, the running states being predicted for all assumed control values, the minimum value memory means for memorizing the minimum value in accordance with the compared values done by the evaluation value comparing means and for supplying the minimum value to the evaluation value comparing means and control value setting means for determining the control value to be set in said driving means in accordance with comparison results of said evaluation value comparing means.

According to still another aspect of the present invention, said running controlling means comprises: control value calculating means having assumed control value generating means for generating a plurality of assumed control values and control value setting means for setting the control value in said driving means; and correction effect calculating means for calculating a magnitude of a change in an evaluation function value which is caused by a change in a control value in accordance with a relationship between the plurality of assumed control values generated from said assumed control value generating means and the corresponding evaluation function values from said evaluation function calculating means, whereby said control value setting means sets the control value in said driving means in accordance with the magnitude of the change in the evaluation function value from said correction effect calculating means.

According to still another aspect of the present invention, said running controlling means comprises running state change rate calculating means for calculating a change rate representing a degree of a change in the state values upon slight changing of the assumed control values in accordance with a relationship between the control and drive values determined by a mechanism of said driving means and the relationship between the drive value and changes in the position and the heading angle of the unmanned vehicle, the state values being obtained to represent the running state after the predetermined period of time when a given control value is set in said driving means, whereby the control value is set in said driving means in accordance with a change rate value and prediction results of the running state.

According to still another aspect of the present invention, evaluation function change rate calculating means is connected to an input of said control value calculating means, said evaluation function change rate calculating means being arranged to calculate a change rate of the evaluation function when the control value changes by the parameters representing the operation from said running command means, the prediction result of the running state from said running state predicting means and the predicted change rate from said running state change rate calculating means when the evaluation function is predetermined solely by the state values representing the running state and the parameters representing the operation, and said control value calculating means determines the control value in accordance with the change rate value of the evaluation function from said evaluation function change rate calculating means and sets the control value in said driving means.

According to still another aspect of the present invention, the running error including the magnitude of the deviation from the preset running path which is obtained by the state values representing the running state and the parameter representing the operation is determined as the evaluation function, said evaluation function change rate calculating means is constituted to calculate the change rate, i.e., a running error correction effect, of the running error with respect to the change in the control value, and the control value calculating means sets the control value in said driving means in accordance with the magnitude of the running error correction effect obtained by said evaluation function change rate calculating circuit.

The above and other objects, features and advantages of the present invention will be apparent from the following detailed description in conjunction with the accompanying drawings.

BRIEF DESCRIPTION OF THE DRAWINGS

FIGS. 9, 9A and 9B are block diagrams showing the detailed configuration of an automatic guidance system according to still another embodiment of the present invention.

FIGS. 11, 11A, 11B, and 11C are diagrams showing functional blocks of an automatic guidance system according to still another embodiment of the present invention.

DETAILED DESCRIPTION OF THE INVENTION

Figure 1:
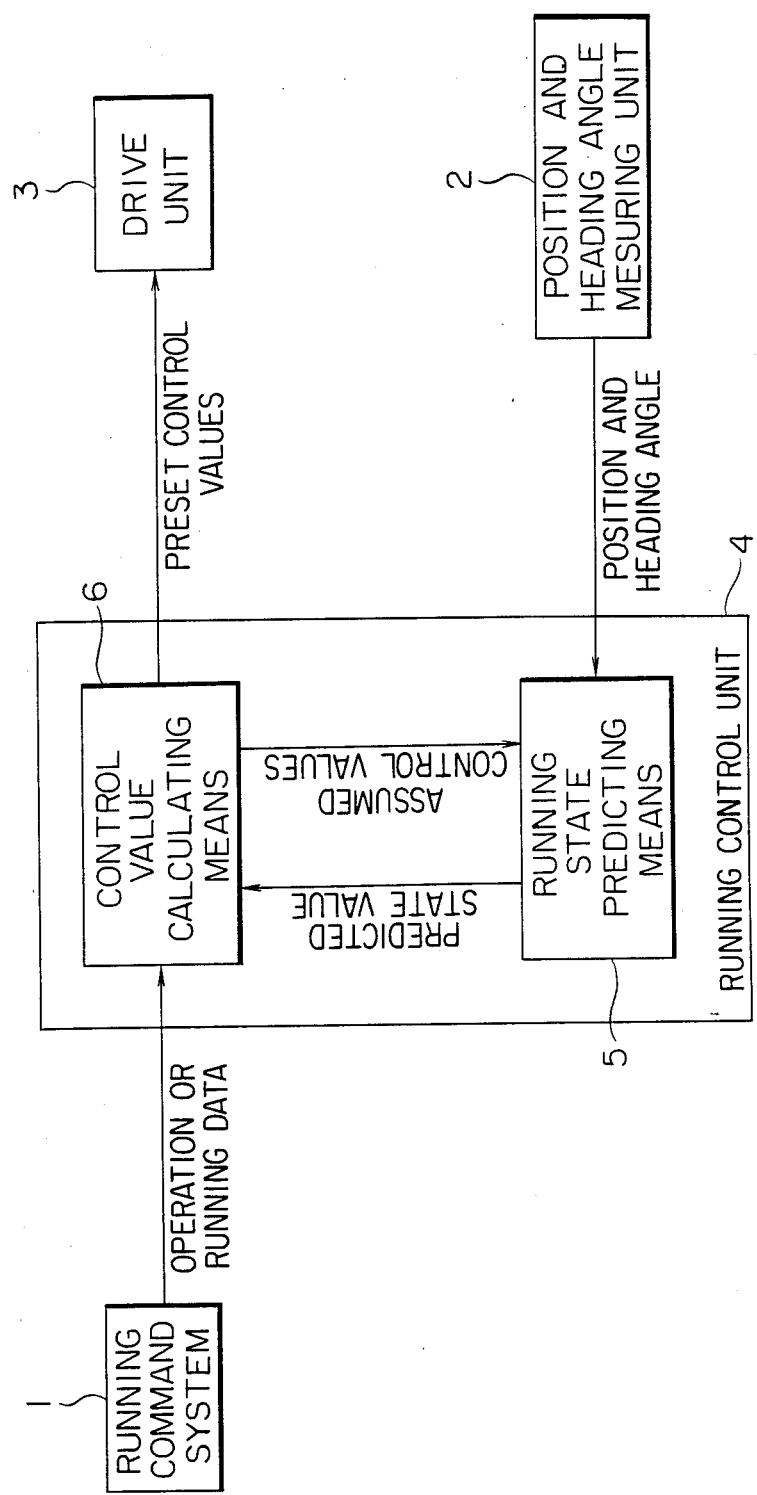
FIG. 1 is a block diagram showing the basic configuration of an automatic guidance system for an unmanned vehicle according to the present invention.

FIG. 1 is a block diagram showing the basic configuration of an automatic guidance system for an unmanned vehicle according to the present invention.

The automatic guidance system comprises a running command system 1 for generating operation or running data to determine operation of an unmanned vehicle, a position and heading angle measuring unit 2 for detecting moving state values such as the position of the unmanned vehicle, its heading angle and the like and for generating these values, a drive unit 3 for moving and turning the unmanned vehicle, and a running control unit 4 for supplying control values to the drive unit 3 so as to perform the operation in accordance with the operation or running data from the running command system 1 and the position information and the heading angle information which are supplied from the position and heading angle measuring unit 2. The running control unit 4 comprises a running state predicting means 5 and a control value calculating means 6. The running state predicting means 5 is connected to the position and heading angle measuring unit 2, and calculates state values which represent the running state and which include at least a running position after a predetermined period of time in accordance with a relationship between a control value and a drive value such as running and turning, which is determined by driving unit 3 and a relationship between the drive value and changes in the position and heading angle of the unmanned vehicle when the given control value is set in the drive unit 3. The control value calculating means 6 is connected to the running state predicting means 5 and the running command system 1 and calculates the control value set in the drive unit 3 in accordance with the operation or running data and the predicted state value of the unmanned vehicle.

The running state predicting means 5 comprises a driving value predicting means and a position and heading angle predicting means. The driving value predicting means predicts the drive values (e.g., running and turning) of the unmanned vehicle in the near future, i.e., after a predetermined period of time by using the relationship between the control and drive values. This relationship is determined by the mechanism of the drive unit 3. The above-mentioned prediction operation is performed in accordance with the current running state information of the vehicle from the position and heading angle measuring unit 2. The position and heading angle predicting means predicts a change in the position and heading angle of the unmanned vehicle driven by the drive unit 3 after the predetermined period. This prediction operation is performed by using a relationship between the drive values and the changes in position and heading angle.

The principle of running state prediction will be described hereinafter. The unmanned vehicle drive unit provides two types of flexible motion: movement of the unmanned vehicle toward a predetermined direction; and turning of the unmanned vehicle at a heading angle. The drive values for showing these two types of flexible motion are a moving velocity and an azimuth angular velocity. Since the operation of the unmanned vehicles should be controlled by these two types of flexible motion, the driving means is constructed so that the two types of flexible motion are determined by the control values. The relationship between the drive values and the control values is determined by the construction of the drive unit. For this reason, the relationship between the control values and the drive values (i.e., the moving velocity and the azimuth angular velocity) which are determined by the construction of the drive unit is checked in advance. Therefore, the drive values such as the moving velocity and the azimuth angular velocity can be predicted so as to correspond to the control values as a result of arithmetic operations.

Figure 2:
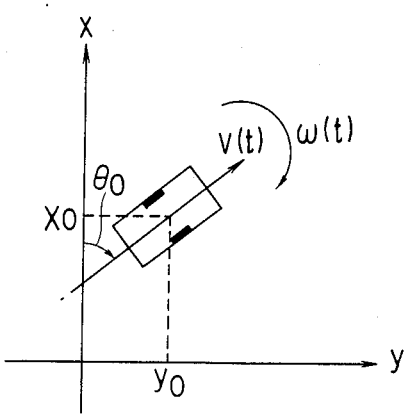
FIG. 2 is a representation for explaining a method of representing a position and a heading angle of an unmanned vehicle.

The position and the heading angle of the unmanned vehicle at a given moment are given, and then a moving velocity and an azimuth angular velocity of the unmanned vehicle are also given. Therefore, the position and the heading angle of the unmanned vehicle after this moment are solely determined by arithmetic calculations. According to the present invention, the position information and the heading angle information of the unmanned vehicle are measured by the position and heading angle measuring unit. Thereafter, the moving velocity and the azimuth angular velocity are calculated among the possible or assumed control values, and the position and the heading angle of the unmanned vehicle in the near future (after the predetermined period) can be predicted in accordance with the assumed control values. As shown in FIG. 2, the x-y coordinate system is used as a reference coordinate system. The position of the unmanned vehicle is represented by x- and y-coordinates. The heading angle is defined as an angle measured from the x-axis clockwise. If the position and heading angle of the unmanned vehicle are defined as $(x_0, y_0, \theta_0)$, a predicted moving velocity is defined as $v(t)$, and the azimuth angular velocity is defined as $\omega(t)$, a heading angle and a position (i.e., x- and y-coordinates) of the unmanned vehicle after $\tau$ seconds are given as follows:

$$\theta(\tau) = \theta_0 + \int_0^\tau \omega(t) \cdot dt \quad (1)$$

$$x(\tau) = x_0 + \int_0^\tau v(t) \cdot \cos\theta(t) \cdot dt$$

$$y(\tau) = y_0 + \int_0^\tau v(t) \cdot \sin\theta(t) \cdot dt$$

The position and the heading angle of the unmanned vehicle in the near future are predicted in accordance with equations (1).

In order to simplify calculations for the control values, another running state value calculating means may be added to constitute a component of the running state predicting means. By another running state value calculating means, running velocity is divided into two components toward the given direction. The two components are derived from prediction values.

In the above-mentioned automatic guidance system for the unmanned vehicle according to the present invention, the running state predicting means predicts a future running state of the unmanned vehicle in accordance with the control values set in the drive unit. Therefore, the degree of accuracy of the operation directed by the running command system in accordance with the preset control values can be evaluated before the drive unit is actually driven. The proper control values can be set in accordance with the evaluation result. Therefore, the running control unit can be adaptively performed under any conditions. Even if the unmanned vehicle is expected to deviate from the preset path due to disturbance caused by a rough road or the like, it is predicted that the initial control values cause such deviation of the unmanned vehicle from the path. Therefore, correction is performed before the vehicle is actually deviated from the path. In addition, running states after the predetermined period can be predicted on the basis of various control values. Among these control values, the proper control values are detected to provide the proper running state and are set in the drive unit. As a result, proper guidance which includes little deviation from the preset path can be achieved.

Figure 3:
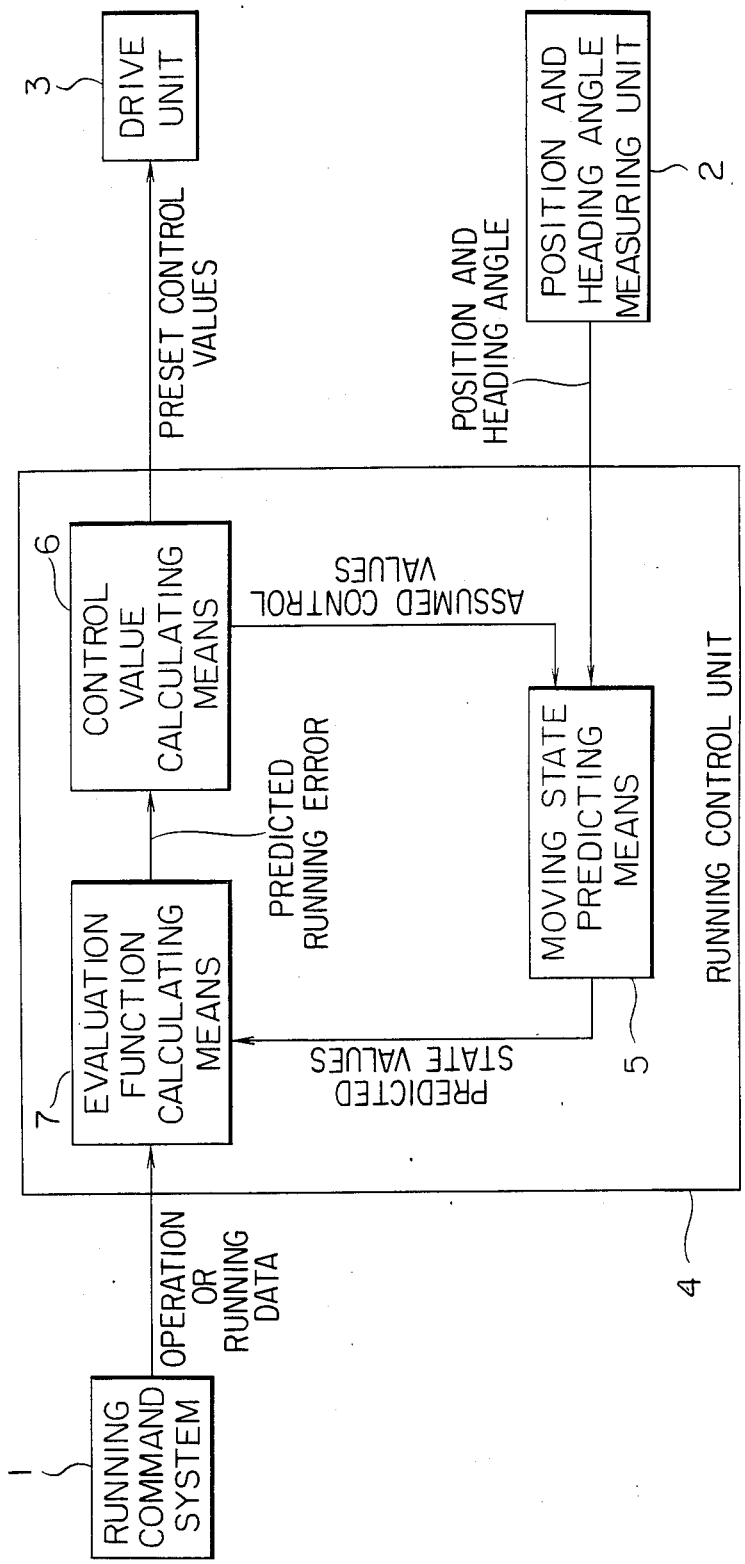
FIGS. 3 to 8 are block diagrams of automatic guidance systems according to embodiments of the present invention, respectively.

FIG. 3 shows an automatic guidance system for an unmanned vehicle according to an embodiment of the present invention. The running control unit 4 in the basic configuration shown in FIG. 1 comprises an evaluation function calculating means 7. The evaluation function calculating means 7 calculates an evaluation function value by using operation or running data representing the operation and supplied from the running command system 1 and the predicted running state values from the running state predicting means 5 in accordance with the evaluation function solely determined by the state values representing the running state and the operation data or running data representing the operation. By this evaluation function calculating means 7, the assumed control values are numerically evaluated by the evaluation function according to whether or not the operation directed by the running command system 1 can be performed, thereby improving guidance precision of the unmanned vehicle. The operation data from the running command system 1 can be limited to that required for the evaluation. As a result, the arrangements of the control value calculating means 6 and the running command system 1 can be simplified. The evaluation function comprises, for example, a running error, a correction value of the running error, or a sum of the running error and a predetermined energy requirement.

According to another embodiment of the present invention, the evaluation function calculating means in FIG. 3 comprises a running error calculating means. In other words, the running control unit comprises a running error calculating means which calculates a change in predicted running error in response to the control values. In this case, the running error quantitatively represents differences (e.g., a deviation from the path, a difference between the preset velocity and the predicted moving velocity) between the predicted running state and the preset state obtained by the operation or running data. The above calculation is performed by comparing the running state predicted by the running state predicting means with the operation or running data from the running command system 1. The running error calculating means detects the magnitude of the running error according to the assumed control values. The control value calculating means determines the control values so as to minimize the running error. The optimal control values are set in the drive unit so as to cause the unmanned vehicle to perform the operation directed by the running command system 1. When the running error includes a distance to the destination or the path, i.e., a position error and the difference between the preset moving velocity and actual moving velocity, i.e., a velocity error, the moving velocity can be controlled in synchronism with the position of the unmanned vehicle. The unmanned vehicle can be decelerated and stopped at the destination. The unmanned vehicle will not overrun or underrun or abruptly stop at the destination, thereby greatly improving positioning precision. Furthermore, the unmanned vehicle is controlled in accordance with the moving error described above, and the operation or running data from the running command system are limited to parameters required to calculate such a running error. Unlike the conventional case, a great amount of data having high redundancy are not required. Therefore, according to this embodiment, the unmanned vehicle can travel along a complicated moving course while a relatively small amount of data are stored in a memory in the unmanned vehicle, thereby increasing the margin for the capacity of the memory device.

Figure 4:
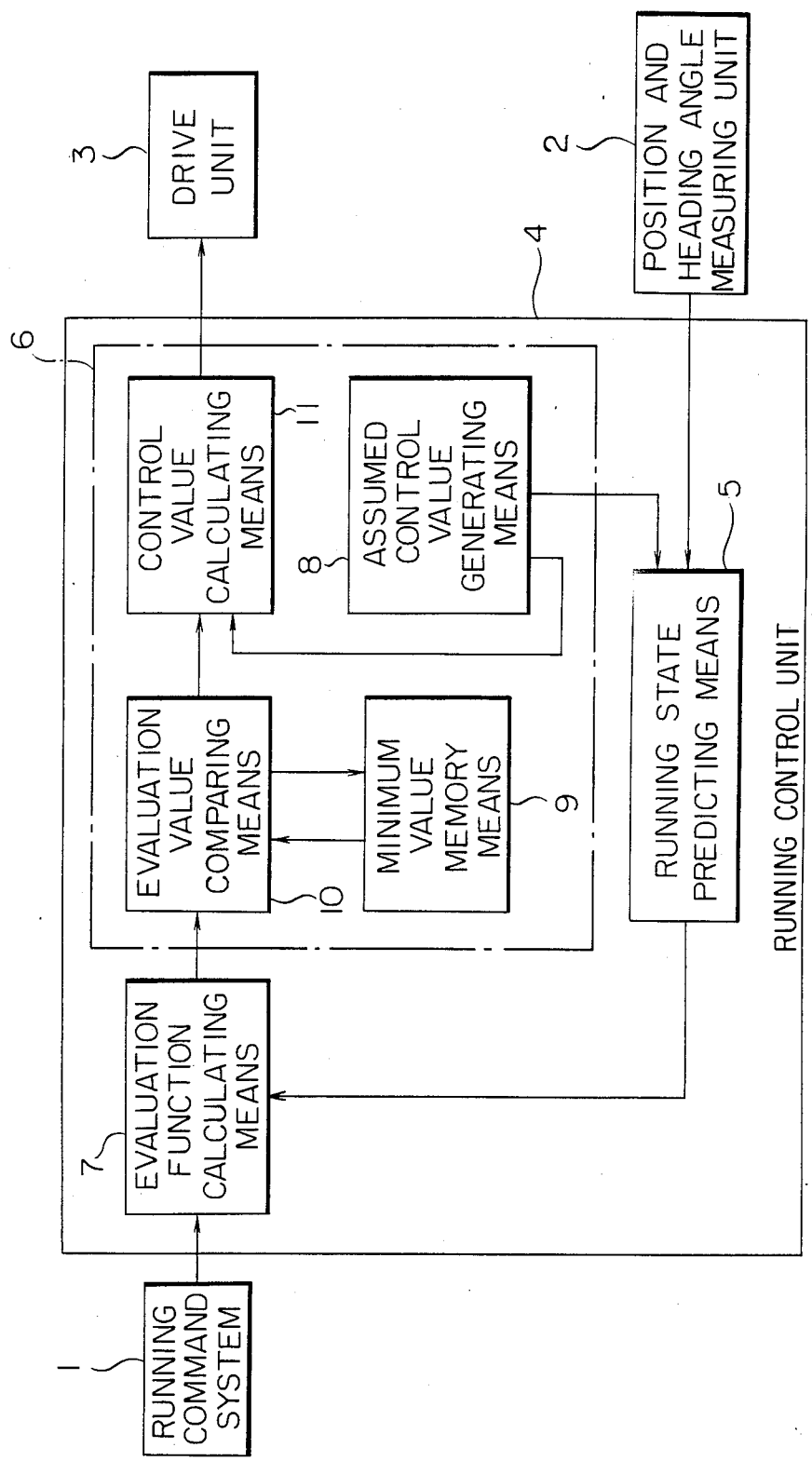

FIG. 4 shows still another embodiment of the present invention. The control value calculating means 6 of the embodiment shown in FIG. 3 comprises an assumed control value generating means 8 for generating a plurality of assumed control values, a minimum value memory means 9 for memorizing the minimum value in accordance with an compared values done by the evaluation value comparing means 10 and for supplying the minimum value to the evaluation value comparing means 10, the evaluation value comparing means 10 comparing state values (representing the moving state) with corresponding evaluation values obtained for the assumed control values after the predetermined period, and a control value setting means 11 for determining the control values set in the drive unit 3 in accordance with comparison results of the evaluation value comparing means. The plurality of assumed control values can be generated from a random number generator arranged in the assumed control value generating means 8. This random number generator has a limited range of random numbers. In this embodiment, several control values are assumed to predict the moving states. Among the assumed control values, the control values optimally matching with the operation directed by the motion directing system are selected by the evaluation value comparing means 10 and are set in the drive unit 3. Therefore, the unmanned vehicle can be smoothly controlled to perform the operation directed by the motion directing system. Control values can be set to provide adaptive moving control under any conditions.

Figure 5:
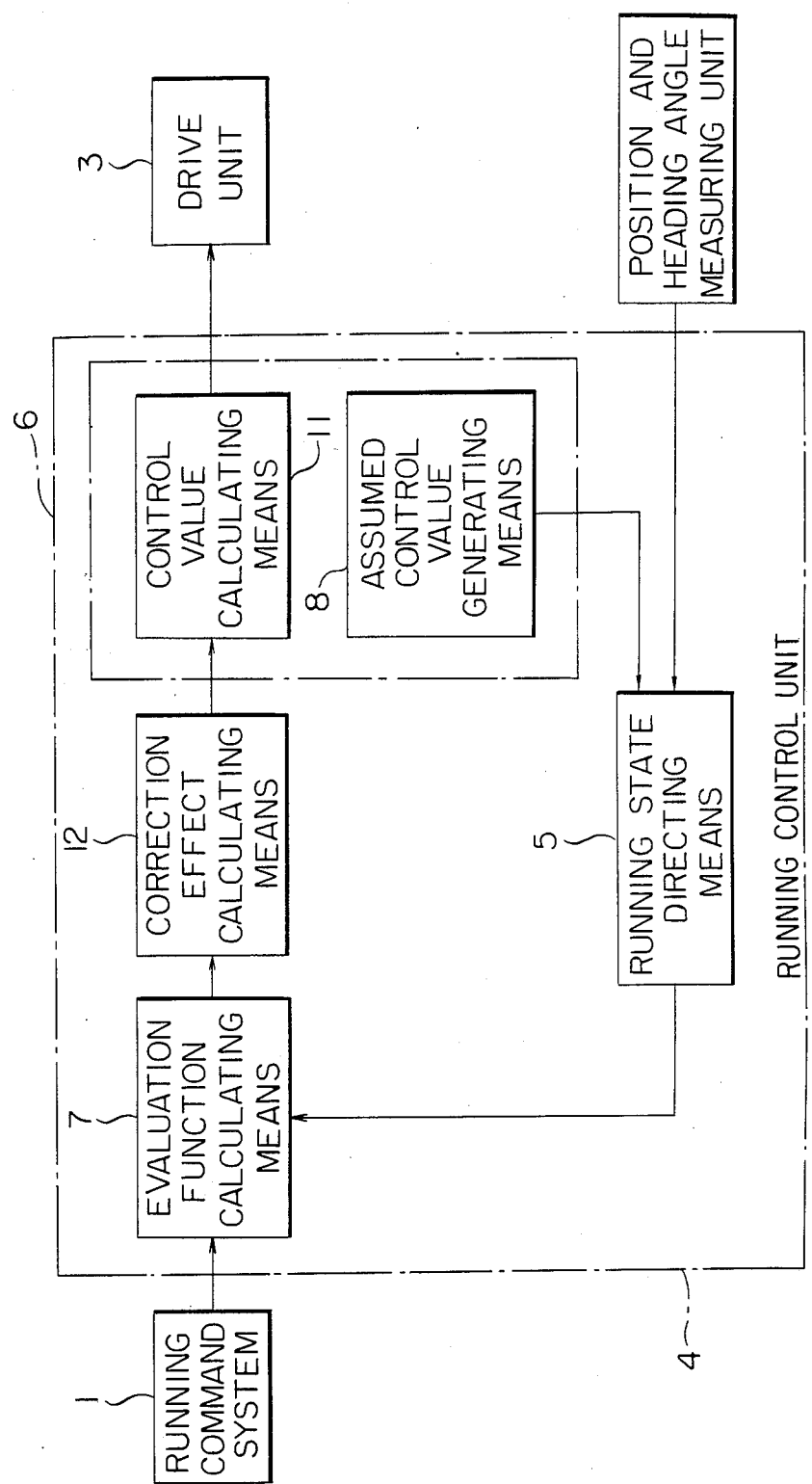

FIG. 5 shows a still another embodiment of the present invention. The motion control unit 4 in the embodiment shown in FIG. 3 comprises a correction effect calculating means 12 in this embodiment. In addition, the control value calculating means 6 comprises an assumed control value generating means 8 for generating a plurality of assumed control values and a control value setting means 11 for setting the control values in the drive unit 3.

The correction effect calculating means 12 calculates the magnitude of an evaluation value change caused by a change in control values in accordance with a relationship between a plurality of assumed control values (these values are linearly independent of each other) generated from the assumed control value generating means 8 and the evaluation function values generated from the evaluation function calculating means 7 corresponding to these assumed control values. The magnitude of the evaluation value change represents the correction effect of the assumed control value change. The control value setting means 11 sets the control values in the drive unit in accordance with the correction effect. According to this embodiment, control values having a large correction effect can be set in the drive unit, so that calculations can be performed to obtain control values to effectively minimize a running error.

Figure 6:
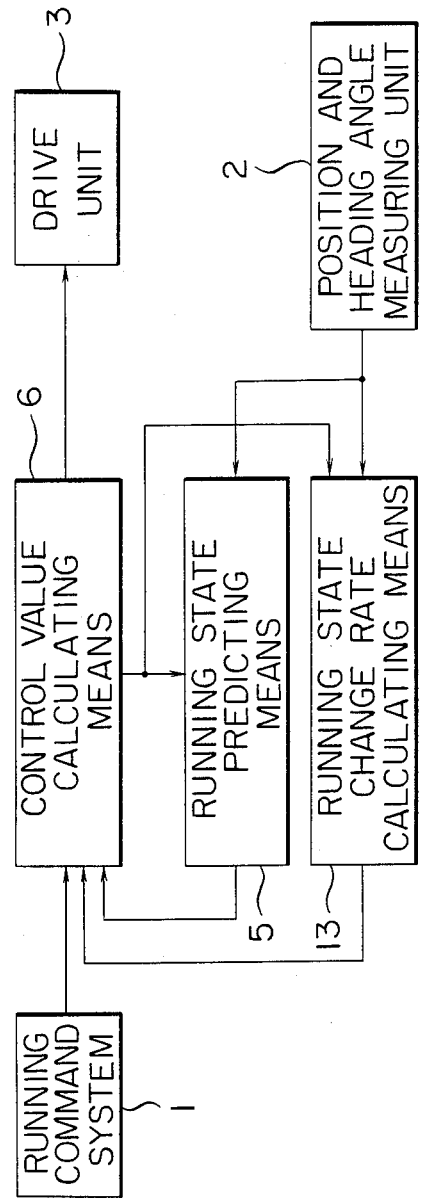

FIG. 6 shows still another embodiment of the present invention. In this embodiment, the motion control unit 4 in the basic configuration shown in FIG. 1 comprises a running state change rate calculating means 13. The control value calculating means 6 sets the control values in the drive unit 3 in accordance with the change rate value and the prediction result of the moving state. The running state change rate calculating means 13 calculates a change rate by using current moving state information of the unmanned vehicle in accordance with the relationship between the control and drive values, which determined by the drive mechanism of the drive unit, and the relationship between the drive values and changes in the position and heading angle. In this case, the change rate represents the degree of change in state values representing the running state after the predetermined period when the given control values are set and the assumed control values slightly change. The control value calculating means 6 can easily set optimal control values in accordance with the change rate. The calculation precision can be improved, and the calculation time can be shortened. In other words, since an influence (effect) acting on the running state and caused by a change in control values can be known, a criterion for changing the assumed control values to obtain the optimal control values is obtained. The calculations will not be without purpose and can be effectively performed. As a result, the control values will not be updated in vain.

Figure 7:
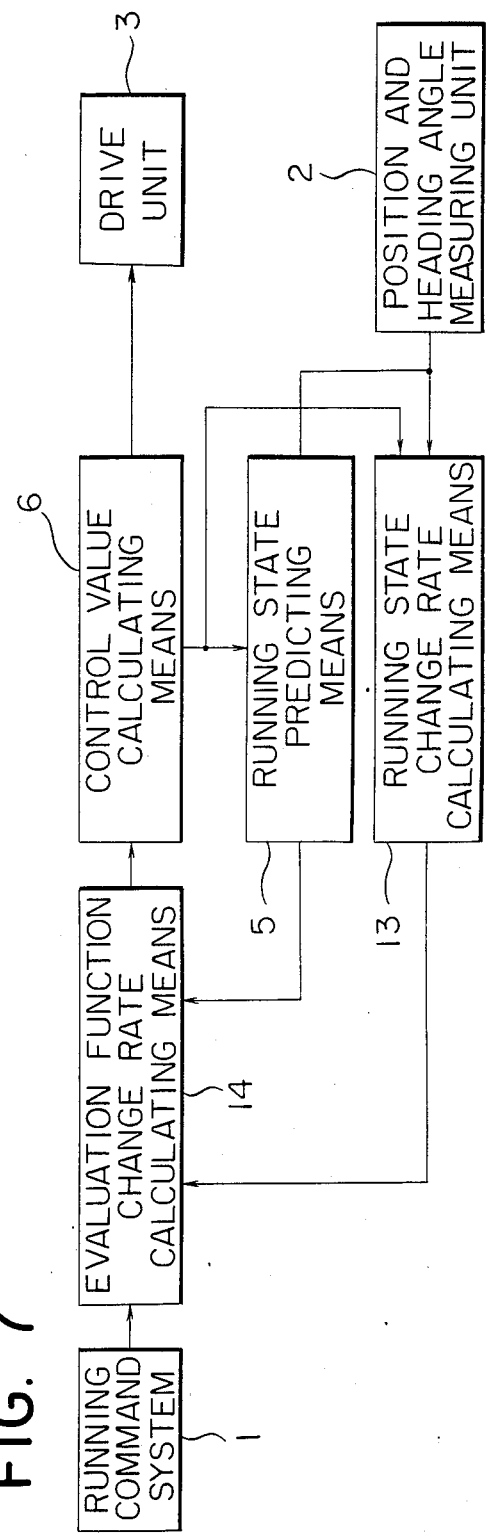

FIG. 7 shows still another embodiment wherein an evaluation function change rate calculating means 14 is connected to the input of the control value calculating means 6 of the embodiment shown in FIG. 6.

The evaluation function, solely determined by the state values representing the running state and the parameters representing the operation of the unmanned vehicle are set in the evaluation function change rate calculating means 14. The calculating means 14 calculates a change rate of the evaluation function in accordance with the prediction result of the running state which is supplied from the running state predicting means 5, and the predicted change rate from the running state change rate calculating means 13. The control value calculating means 6 calculates the optimal control values in accordance with the change rate of the evaluation function and sets the optimal control values in the drive unit 3.

Figure 8:
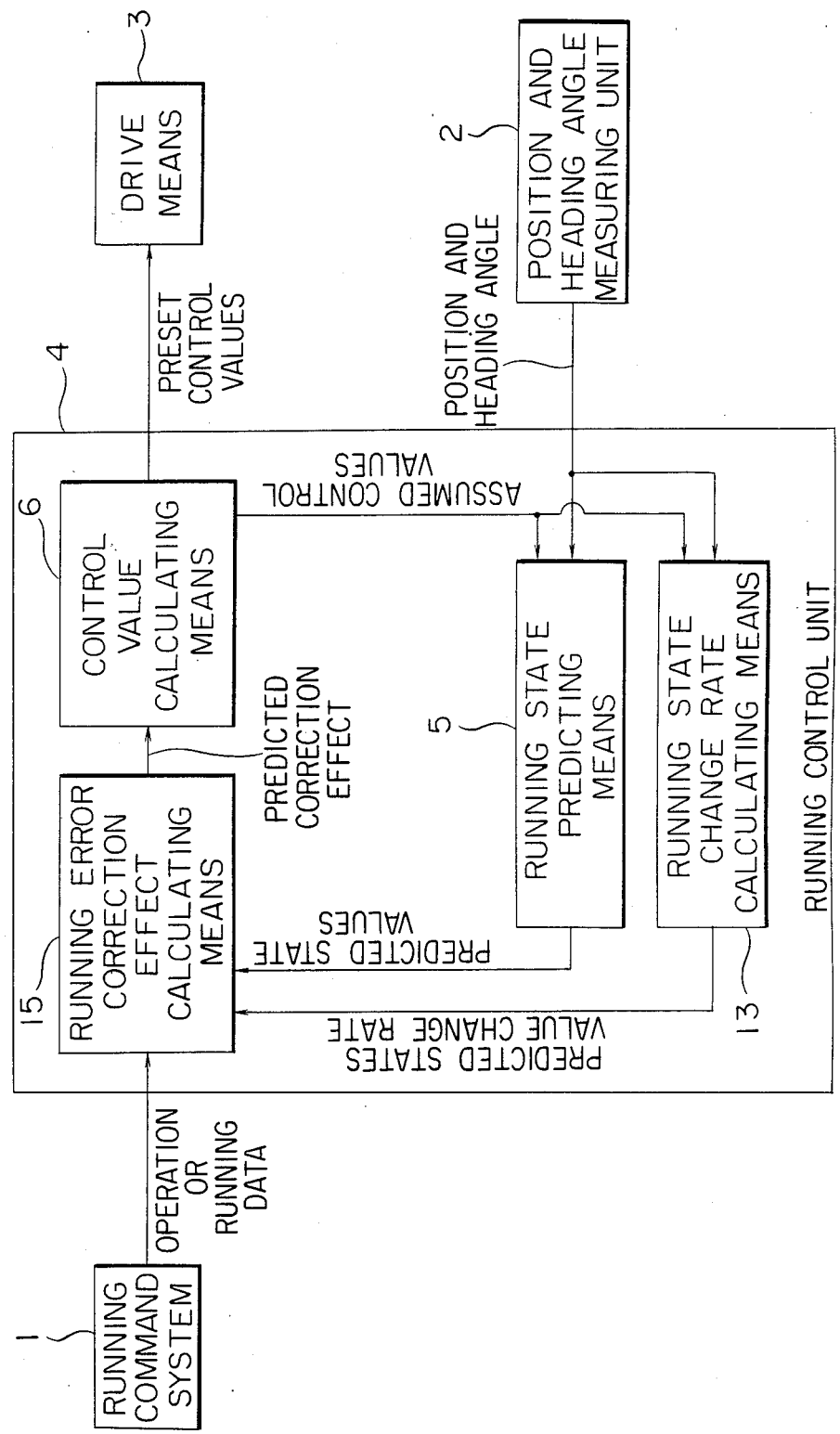

FIG. 8 shows a still another embodiment wherein the evaluation function in the embodiment shown in FIG. 7 comprises the running error. More specifically, the evaluation function change rate calculating means 14 in FIG. 7 comprises a running error correction effect calculating means 15.

With the arrangement shown in FIG. 7 or FIG. 8, in order to obtain the optimal control values among the assumed control values to correct the evaluation function value (the running error), the polarity of changes in control values and their correction effect can be obtained, so that the control values obtained by greatly changing an assumed control value having a large correction effect in accordance with a predetermined polarity and by slightly changing the assumed control value having a small correction effect in accordance with the predetermined polarity serve to decrease the predicted evaluation function value (the running error) as compared with the assumed control value. By this operation, the optimal control values are obtained so as to decrease the running error and can be set in the drive unit so as to perform the operation directed by the running command system. With the above arrangement, a plurality of control values are assumed to obtain the optimal control values so as to decrease the evaluation function value (the running error) although the evaluation function value (the running error) is not calculated, thereby effectively calculating optimal control values with a small amount of data. Therefore, a simple calculation unit can be used to accurately move the unmanned vehicle along a proper path and stop it at a predetermined position.

According to the present invention and its preferred embodiments as described above, the unmanned vehicle can be driven in accordance with a small amount of operation or running data stored in a memory having a relatively small capacity, resulting in low cost. In addition, equipment to be used is not limited to a specific apparatus. According to the present invention, a deviation from the preset path and a stopping error of the automatic guidance system are reduced as compared with those of the conventional automatic guidance system. According to the present invention an unmanned vehicle using a conventional guide member such as an electromagnetic cable can be driven without need for the guide member, so that an unmanned vehicle of low installation and maintenance cost can be provided. The present invention is applied to an unmanned vehicle such as an emergency vehicle which does not allow installation of guide members along a predetermined running path. Thus an unmanned vehicle automatic guidance system never achieved by a conventional automatic guidance system can be provided by the present invention.

The present invention will be described with a detailed arrangement of an automatic guidance system.

Figure 9A:
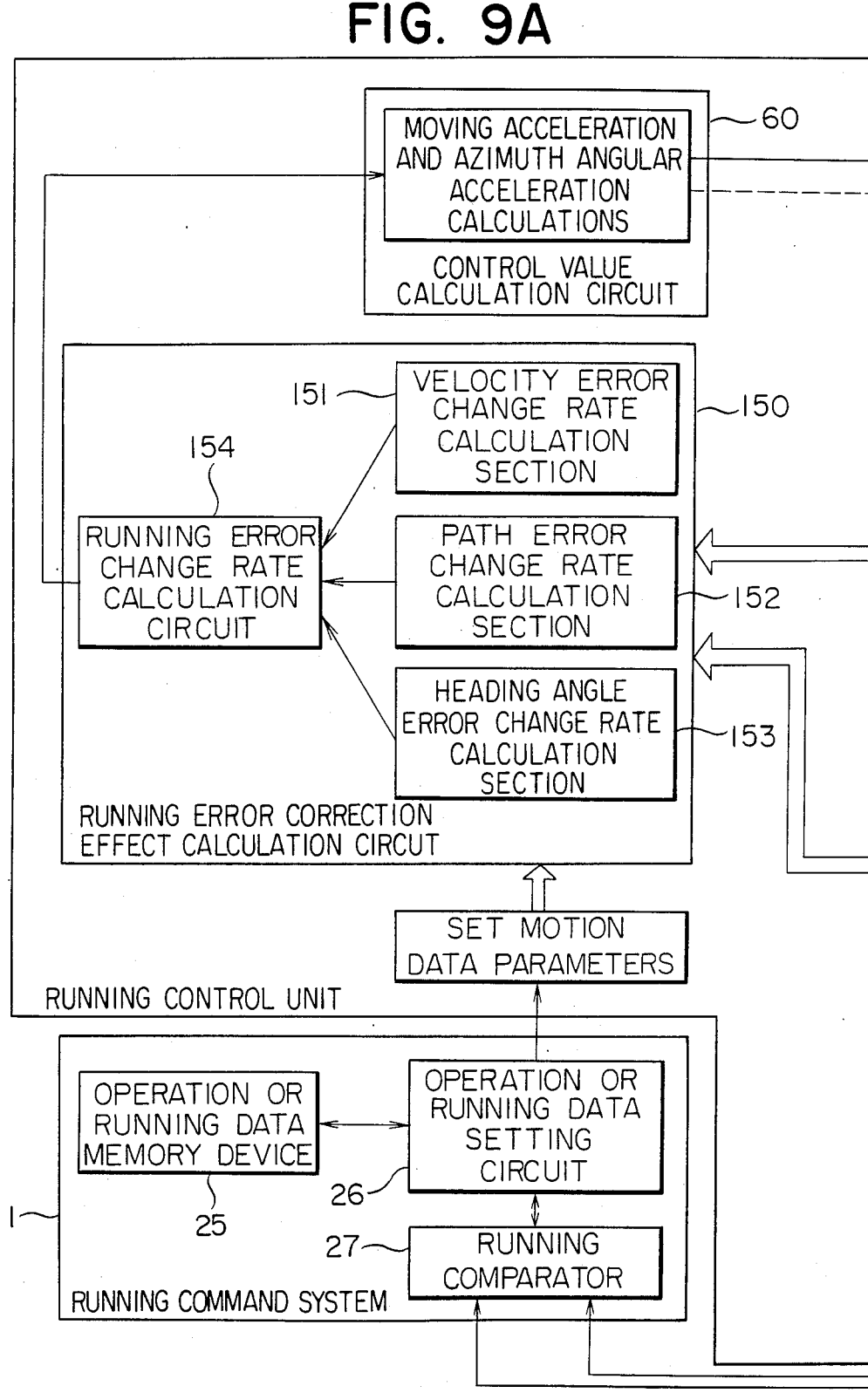

FIG. 9 shows the detailed arrangement of the automatic guidance system of the embodiment shown in FIG. 8. The drive unit 3 of the unmanned vehicle comprises a drive wheel rotational angle converter 31, a servo amplifier 32 and a drive motor 33. The right and left wheels of the unmanned vehicle are independently driven by the drive motor 33 in accordance with the moving velocity and the azimuth angular velocity which are set by the running control unit 4, thereby obtaining optimal linear motion and turning. The drive wheel rotational angle converter 31 supplies current moving and azimuth angular velocities of the unmanned vehicle to the running control unit 4 and the running command system 1.

The position and heading angle measuring unit 2 comprises a wheel rotation angle detector 21 for detecting the rotation speed of the wheel rotated along a road surface, and a position and heading angle calculation circuit 22 for calculating the position and the heading angle of the unmanned vehicle in accordance with the detected rotation angle of the wheel. The position information and the heading angle information are supplied to the running control unit 4 and the running command system 1.

The running command system 1 comprises a motion data memory device 25, an operation or running data setting circuit 26, and a running state comparator 27. The motion data for changing the path, and traveling and stopping of operation of the unmanned vehicle are selectively read out from the memory 25 and are set in the running control unit in accordance with the moving and azimuth angular velocity information from the drive unit and the position and heading angle information from the position and heading angle measuring unit 2, thereby controlling the running control unit 4.

Figure 10:
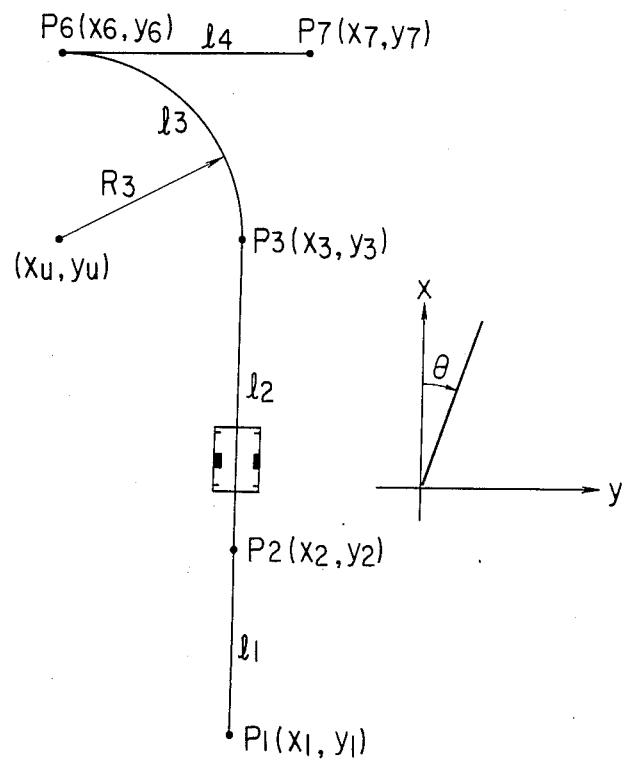
FIG. 10 is a representation showing a running path and a method of representing the running path.

FIG. 10 shows a travel example of the unmanned vehicle. The contents of data supplied from the running command system 1 to the running control unit 4 will be described. Assume that the unmanned vehicle standing at point $p_1$ is guided to point $p_7$ through paths $l_1$, $l_2$, $l_3$ and $l_4$. The running command system 1 supplies the following commands to the running control unit 4 in accordance with the running state values such as the position and the heading angle of the unmanned vehicle so as to cause the running control unit 4 to move the unmanned vehicle to the destination.

(1) move the unmanned vehicle from point $p_1$ to point $p_2$ along the path $l_1$
(2) move the unmanned vehicle from point $p_2$ to point $p_3$ along the path $l_2$
(3) move the unmanned vehicle from point $p_3$ to point $p_6$ along the path $l_3$
(4) stop the unmanned vehicle at point $p_6$
(5) turn the unmanned vehicle at point $p_6$ through 180°
(6) move the unmanned vehicle from point $p_6$ to point $p_7$ along the path $l_4$
(7) stop the unmanned vehicle at point $p_7$ The data of the path and points in the moving commands are represented in the coordinate system. For example, the linear paths $l_1$ and $l_2$ can be given by the x- and y-coordinates of the start and end points. The curved path $l_3$ is represented by x- and y-coordinates of the center of the radius of curvature and the start and end points. The position and heading angle data generated from the position and heading angle measuring unit is also represented by the same coordinate system. The operation or running data set by the running command system 1 to the motion control unit 4 comprise data of (1) linear motion, (2) curvature motion and (3) stopping, and parameters corresponding to the selected operation.

The position and heading angle information is represented by x- and y-coordinates of the x-y coordinate system and an angle measured from the x-axis clockwise. The parameters of the linear motion represented by the operation or running data are coordinate points $(x_s, y_s)$ and $(x_e, y_e)$ corresponding to the start and end points of the path $l_1$ or $l_2$, and the moving velocity $\bar{v}$. Similarly, the parameters of the curved motion represented by the motion data are coordinate points $(x_s, y_s)$ and $(x_e, y_e)$ corresponding to the start and end points of the path $l_3$, a radius R of curvature, a center $(x_c, y_c)$ of the radius of curvature, and a moving velocity $\bar{v}$. Parameters of stopping are a coordinate point $(x_e, y_e)$ and a corresponding heading angle $\theta_e$.

The running control unit 4 comprises a running state prediction circuit 50, a running state change rate calculation circuit 130, a control value calculation circuit 60 and a running error correction effect calculation circuit 150. The running state prediction circuit 50 calculates as predicted state values (representing the running state after the predetermined period) the moving velocity v, the azimuth angular velocity $\omega$, the position (x,y), the heading angle $\theta$, the x-axis moving velocity component $v_x$, and the y-axis moving velocity component $v_y$ in accordance with the moving and azimuth angular velocity information from the drive unit and the position and heading angle coordinate information from the position and heading angle measuring unit 2. For the sake of simplicity, when a moving acceleration $a_v$ and an azimuth angular acceleration $a_\omega$ as the control values are given as zero, the moving velocity, the azimuth angular velocity, the position, the heading angle, the x-axis moving velocity component and the y-axis moving velocity component are represented $\hat{v}$, $\hat{\omega}$, $(\hat{x}, \hat{y})$, $\hat{\theta}$, $\hat{v}_x$ and $\hat{v}_y$, respectively.

The running state change rate calculation circuit 130 calculates change rates representing changes in predicted state values which are caused by changes in the moving acceleration $a_v$ and the azimuth angular acceleration $a_\omega$ as follows:

$d\hat{v}/da_v$, $d\hat{\omega}/da_v$, $d\hat{\theta}/da_v$, $d\hat{y}/da_v$, $d\hat{v}_x/da_v$, $d\hat{v}_y/da_v$, $d\hat{v}/da_\omega$, $d\hat{\omega}/da_\omega$, $d\hat{\theta}/da_\omega$, $d\hat{x}/da_\omega$, $d\hat{y}/da_\omega$, $d\hat{v}_x/da_\omega$, $d\hat{v}_y/da_\omega$ The predicted state values and their change rates are calculated in accordance with the current moving velocity $v_0$ and the current azimuth angular velocity $\omega_0$ which are generated from the drive unit, and the position $(x_0, y_0)$ and the heading angle $\theta_0$ which are generated from the position and heading angle measuring unit 2. These are derived in accordance with relationships represented by equations (1) among the moving velocity v, the azimuth angular velocity $\omega$, the position (x,y) and the heading angle $\theta$, and the relationships represented by equations (2) and (3) among the the moving acceleration $a_v$, the azimuth angular acceleration $a_\omega$, and as drive values the moving and azimuth angular velocities from the drive unit:

$$v(t) = v_0 + \int_0^t a_v \cdot dt \qquad (2)$$

$$\omega(t) = \omega_0 + \int_0^t a_\omega \cdot dt \qquad (3)$$

These relationships are approximated to derive equations (4), so that the predicted state values and their change rates are calculated in accordance with equations (4).

In equations (4), when the moving acceleration and the azimuth angular acceleration are zero, $\hat{v}$, $\hat{\omega}$, $d\hat{v}/da_v$, $d\hat{v}/da_\omega$, $d\hat{\omega}/da_v$, $d\hat{\omega}/da_\omega$, $d\hat{\theta}/da_v$ and $d\hat{\theta}/da_\omega$ can be automatically derived in accordance with the current moving state information and the preset time $\tau$, so that they need not be calculated.

$$\hat{v}(0,0) = v_0 \qquad (4)$$

$d\hat{v}/da_v = \tau$ $d\hat{v}/da_\omega = 0$ $\hat{\omega} = \omega_0$ $d\hat{\omega}/da_v = 0$ $d\hat{\omega}/da_\omega = \tau$ $\hat{x} = x_0 + v_0\cos\theta_0 \cdot \tau$ $d\hat{x}/da_v = (\frac{1}{2})\cos\theta_0 \cdot \tau^2$ $d\hat{x}/da_\omega = -(1/6)v_0 \cdot \sin\theta_0 \cdot \tau^3$ $y = y_0 + v_0 \cdot \sin\theta_0 \cdot \tau$ $d\hat{y}/da_v = (\frac{1}{2})\sin\theta_0 \cdot \tau^2$ $d\hat{y}/da_\omega = (1/6)v_0\cos\theta10 \cdot \tau^3$ $\hat{\theta} = \theta_0 + \theta_0\tau$ $d\hat{\theta}/da_v = 0$ $d\hat{\theta}/da_\omega = (\frac{1}{2})\tau^2$ $\hat{v}_x = v_0 \cdot \cos\theta_0 - v_0 \cdot \omega_0\sin\theta_0\tau$ $d\hat{v}_x/da_v = \cos\theta_0 \cdot \tau$ $d\hat{v}_x/da_\omega = -(\frac{1}{2})v_0\sin\theta_0 \cdot \tau^2$ $\hat{v}_y = v_0\sin\theta_0 + v_0 \cdot \omega_0\cos\theta_0 \cdot \tau$ $d\hat{v}_y/da_v = \sin\theta_0 \cdot \tau$ $d\hat{v}_y/da_\omega = (\frac{1}{2})v_0 \cdot \sin\theta_0 \cdot \tau^2$ The running error correction effect calculation circuit 150 calculates change ratios $d\epsilon/da_v$ and $d\epsilon/da_\omega$ of the running error $\epsilon$ in accordance with the predicted state values from the running state prediction circuit 50, the state change rates calculated by the running state change rate calculation circuit 130 and the parameters of the operation or running data from the running command system 1 when the values of the moving acceleration $a_v$ and the azimuth angular acceleration $a_\omega$ slightly change from zero.

The running error $\epsilon$ is defined as follows in this embodiment:

$$\epsilon = k_0 \cdot \epsilon_0 + k_1 \cdot \epsilon_1 + k_2 \cdot \epsilon_2 \qquad (5)$$

where $k_0$, $k_2$ and $k_3$ are the positive constants.

$$\epsilon_0 = (\hat{v} - \bar{v})^2 + (w^2/4)(\hat{\omega} - \bar{\omega})^2 \quad (6)$$

$$\epsilon_1 = \begin{cases} \{(y_e - y_s)(\hat{x} - x_s) - (x_e - x_s)(\hat{y} - y_s)\}^2 / \\ \quad \{(x_e - x_s)^2 + (y_e - y_s)^2\} \\ \quad \ldots \text{straight path traveling} \\ (\sqrt{(\hat{x} - x_c)^2 + (\hat{y} - y_c)^2} - R)^2 \\ \quad \ldots \text{curved path traveling} \\ (\hat{x} - x_e)^2 + (\hat{y} - y_e)^2 \\ \quad \ldots \text{stopping} \end{cases} \quad (7)$$

$$\epsilon_2 = \begin{cases} \{(y_e - y_s) \cdot \hat{v}_x - (x_e - x_s) \cdot \hat{v}_y\}^2 / \\ \quad \{(x_e - x_s)^2 + (y_e - y_s)^2\} \\ \quad \ldots \text{straight path traveling} \\ \{(\hat{x} - x_c)\hat{v}_x - (\hat{y} - y_c) \cdot \hat{v}_y\}^2 / \\ \quad \{(\hat{x} - x_c)^2 + (\hat{y} - y_c)^2\} \\ \quad \ldots \text{curved path traveling} \\ (\hat{\theta} - \theta_0)^2 \\ \quad \ldots \text{stopping} \end{cases} \quad (8)$$

where w is the distance between the the drive wheels, $\bar{v}$ is the present moving velocity, $\bar{\omega}$ is the preset value of the azimuth angular velocity determined by the moving velocity and the radius of curvature, wherein $\bar{\omega} = \bar{v}/R$, $\epsilon_0$ represents moving and azimuth angular velocity errors, $\epsilon_1$ is the deviation from the path when the unmanned vehicle is moved, but is at a distance from the stopping point when the unmanned vehicle is stopped, $\epsilon_2$ represents the moving velocity along a direction perpendicular to the moving path when the unmanned vehicle is driven, or the deviation from the preset direction when the unmanned vehicle is stopped. The running error $\epsilon$ is obtained such that these errors are weighted and added.

The change rates with respect to the running errors are expressed in accordance with equation (5):

$$d\epsilon/da_v = k_0 d\epsilon_0/da_v + k_1 d\epsilon_1/da_v + k_2 d\epsilon_2/da_v$$
$$d\epsilon/da_\omega = k_0 d\epsilon_0/da_\omega + k_1 d\epsilon_1/da_\omega + k_2 d\epsilon_2/da_\omega \quad (9)$$

The running error correction effect calculation circuit 150 performs the operations in accordance with equations (9). The running error correction effect calculation circuit 150 comprises a velocity error change rate calculation section 151 for calculating the ratios $d\epsilon_0/da_v$ and $d\epsilon_0/da_\omega$, a path error change rate calculation section 152 for calculating the ratios $d\epsilon_1/da_v$ and $d\epsilon_1/da_\omega$, a heading angle error change rate calculation section 153 for calculating the ratio $d\epsilon_2/da_v$ and the angular acceleration change $da_\omega$, and a moving error change rate calculation circuit 154 for calculating the ratios $d\epsilon/da_v$ of equations (9) in accordance with the outputs from the operation sections 151 to 153.

The control value calculation circuit 60 calculates as $-k_v d\epsilon/da_v$ and $-k_\omega d\epsilon/da_\omega$ the moving acceleration $\bar{a}_v$ and the azimuth angular acceleration $\bar{a}_\omega$ so as to decrease the running errors in accordance with the running error change rates $d\epsilon/da_v$ and $d\epsilon/da_\omega$ which are calculated by the running error correction effect calculation circuit 150. The control values are increased when the correction effect is high. However, the control values are decreased when the correction effect is low. The accelerations $\bar{a}_v$ and $\bar{a}_\omega$ are set in the drive unit 3 to decrease the running errors in accordance with the magnitude (i.e., the running error magnitude) of the correction effect magnitude as described above, thereby providing effective motion control.

The respective calculation circuits in this embodiment may be constituted by various types of known analog arithmetic operation units or a normal combination of digital logic circuits.

A microcomputer may be used to incorporate a program instead of the hardware configuration consisting of specific calculation circuits, resulting in practical convenience.

Figure 11A:
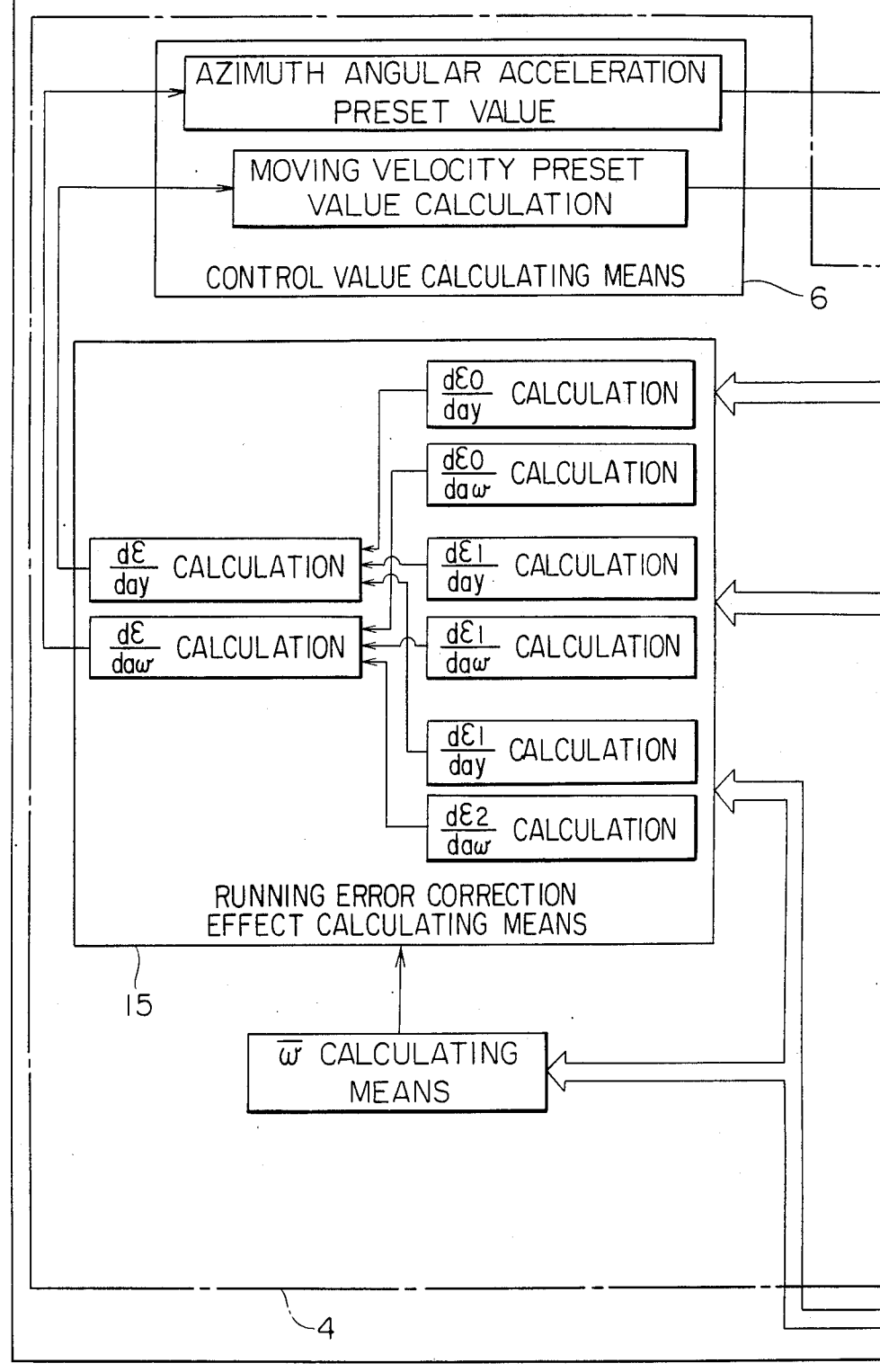
Figure 11B:
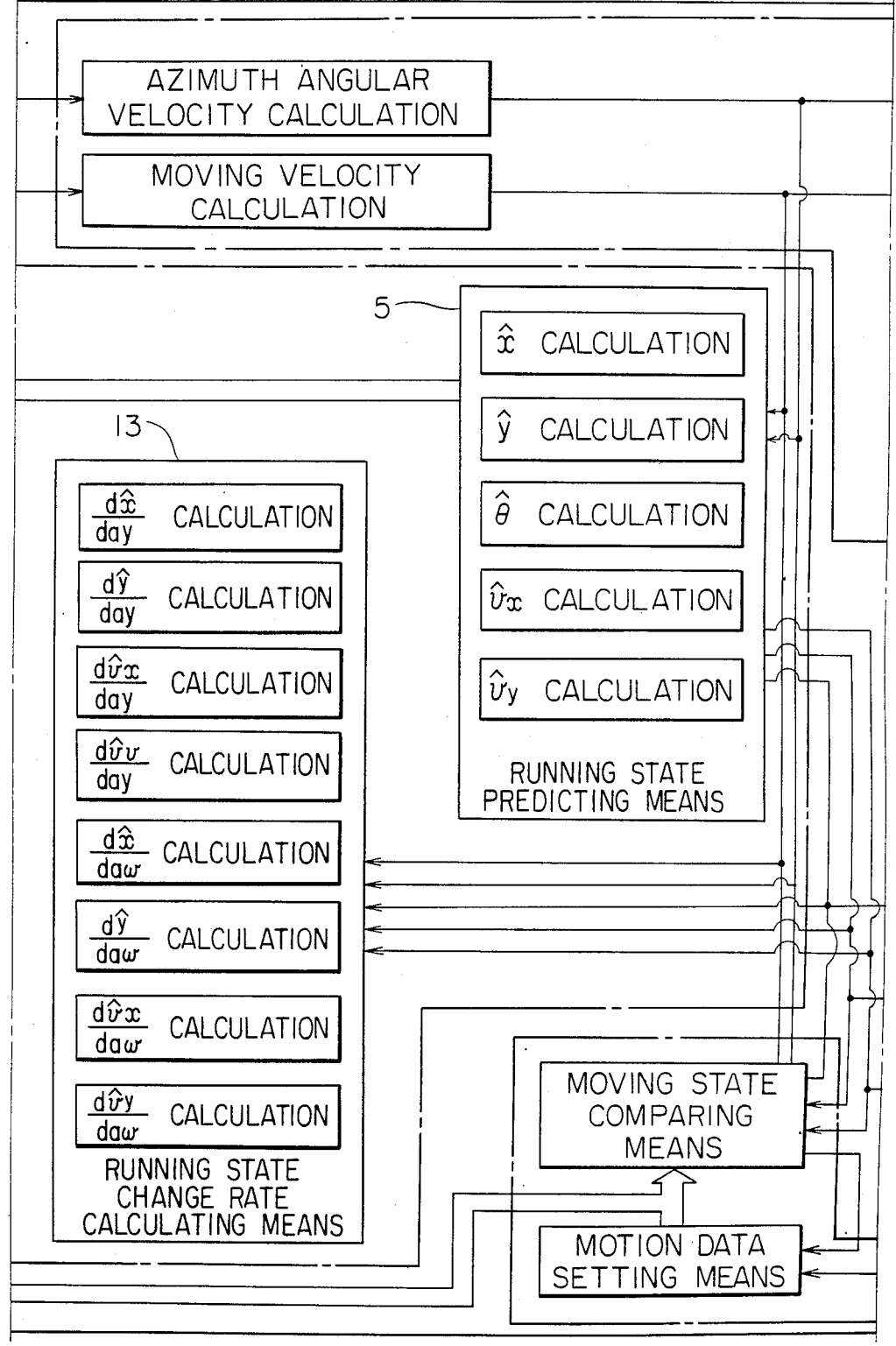
Figure 12:
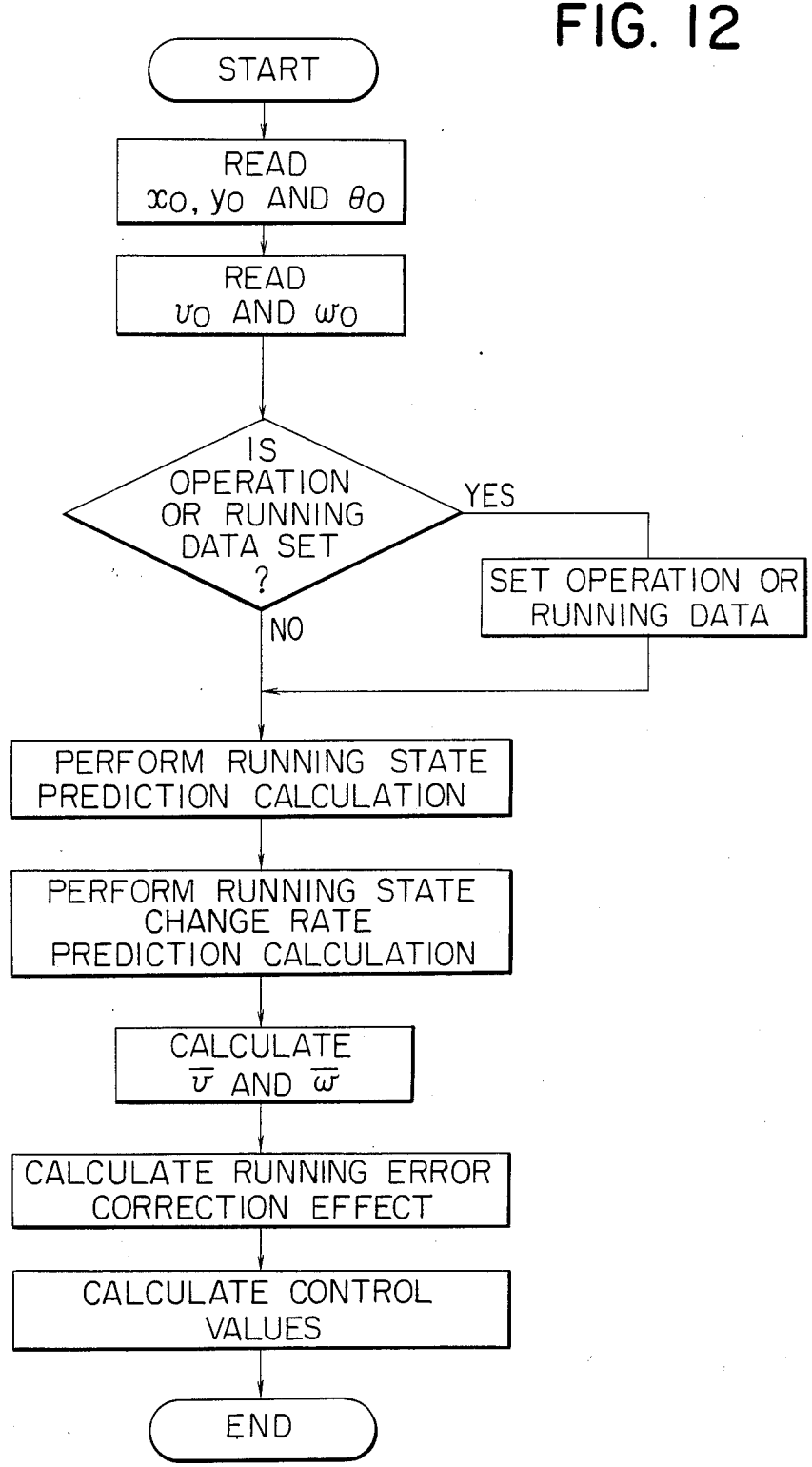
FIG. 12 is a flow chart for explaining the operation of a running control unit shown in FIG. 11.

An embodiment of the automatic guidance system using a microcomputer will be described hereinafter. FIG. 11 is a diagram showing the function blocks of the automatic guidance system. FIG. 12 is a flow chart for explaining the operation under the control of the microcomputer. The drive unit 3 calculates the moving velocity and the azimuth angular velocity in accordance with integral transform. The drive unit 3 then calculates the rotational speed of a wheel so as to achieve the calculated moving and azimuth angular velocities. The rotational speed of the drive wheel which is calculated by a microcomputer 15 is supplied to a servo amplifier 32 through a D/A converter 34. An output from the servo amplifier 32 drives a motor 33 for driving the drive wheels, so that the unmanned vehicle is driven. In the position and heading angle measuring unit 2, the rotational speed of the wheel is detected by an encoder 23 and is transmitted to the microcomputer 15 through an up/down counter 24. The microcomputer 15 calculates the position and the heading angle of the unmanned vehicle by using the rotational speed information supplied thereto in accordance with the program stored therein.

The running control unit 4 comprises a running state predicting means 5 for calculating $\hat{v}$, $\hat{\omega}$, $\hat{x}$, $\hat{y}$, $\hat{\theta}$, $\hat{v}_x$ and $\hat{v}_y$, a running state change rate calculation means 13 for calculating $d\hat{x}/da_v, d\hat{y}/da_v$, $d\hat{v}_x/da_v, d\hat{v}_y/da_v, d\hat{x}/da_\omega, d\hat{v}_x/da_\omega$, and $d\hat{v}_y/da_\omega$, a running error correction effect calculating means 15 for calculating differentials $d\epsilon/da_v$ and $d\epsilon/da_\omega$ of the moving errors $\epsilon$ as a function of the moving acceleration $a_v$ and the azimuth angular acceleration $a_\omega$, as defined in equation (5), and a control value calculating means 6 for setting the moving and azimuth angular velocities together with the correction effect in the drive unit 3. These functions of the running control unit 4 are achieved by calculations in accordance with the prestored program in the microcomputer 15. The microcomputer 15 performs various operations under the control of a multitask operating system for simultaneously performing the position and heading angle calculation, the running state comparison, the operation or running data setting, the running state prediction, the running error correction effect calculation, the control value setting, the moving velocity conversion, and the drive wheel rotational speed conversion.

The flow chart of the program for the running control unit 4 is illustrated in FIG. 12. The position and heading angle information $x_0$, $y_0$ and $\theta_0$ and the moving and azimuth angular velocity information $v_0$ and $\omega_0$ are read in accordance with the position and heading angle calculation program and the moving and azimuth angular velocity calculation program which are executed independently of the running control program. The read $x_0, y_0, \theta_0$, $v_0$ and $\omega_0$ data are compared with the currently set operation or running data by means of the running state comparison function as part of the function of the running command system so as to check necessity for switching of the moving paths and traveling or stopping of the unmanned vehicle. In accordance with this check and subsequent decision, the operation or running data are set in the running control unit. In order to achieve the function corresponding to the running control unit, the running state prediction calculation program is executed to predict the state values representing the running state after the $\tau$ seconds by using the $x_0$, $y_0$, $\theta_0$, $v_0$ and $\omega_0$ in accordance with equations (4). At the same time, the state change rate prediction calculation program is executed. Subsequently, the moving velocity $\bar{v}$ and the azimuth angular velocity $\bar{\omega}$ required for the preset operation are calculated in accordance with the parameters preset as the operation or running data and the information calculated in accordance with the running state change rate prediction operation program. By using the moving velocity $\bar{v}$ and the azimuth angular velocity $\bar{\omega}$, the running error correction effect calculation program is executed to calculate the correction effects $d\epsilon/da_v$ and $d\epsilon/da_\omega$ of the moving acceleration $a_v$ and the azimuth angular acceleration $a_\omega$ for the running error $\epsilon$ as a sum of the velocity error $\epsilon_0$, the position error $\epsilon_1$ and the heading angle error $\epsilon_2$ defined by equations (5) to (8). Finally, the control value setting program is executed to set $-k_v d\epsilon/da_v$ as the moving acceleration and $-k_\omega d\epsilon/da_\omega$ as the azimuth angular acceleration in the drive unit in accordance with the correction effects $d\epsilon/da_v$ and $d\epsilon/da_\omega$. A series of programs are started by a soft timer set in the microcomputer and are periodically performed. Therefore, in the embodiment of the present invention, the running state values are sampled and calculated to set the control values so as to perform sampled-value control.

Figure 13:
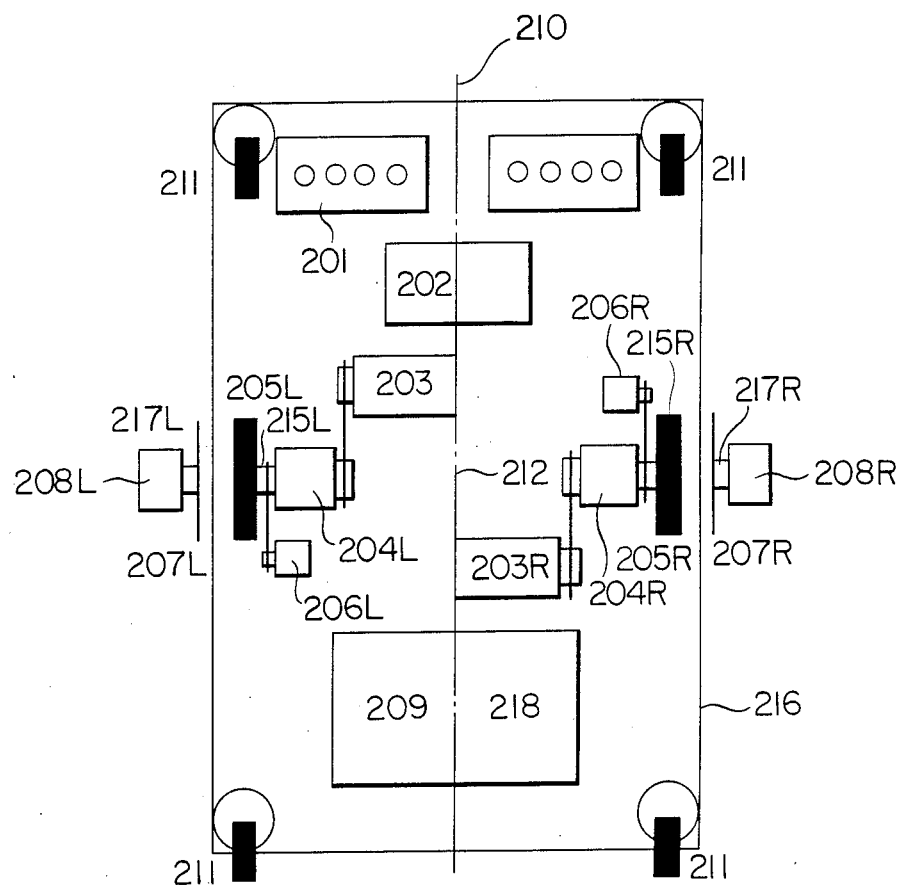
FIG. 13 is a schematic diagram showing an unmanned vehicle.

FIG. 13 shows the schematic construction of the unmanned vehicle used in the present invention. The unmanned vehicle uses batteries 201 as power sources. Left and right drive wheels 205L and 205R are independently driven by motors 203L and 203R through transmission systems 204L and 204R comprising reduction gears, clutches and brakes, respectively. A servo unit 202 controls the motors 203L and 203R in such a manner that rotational speeds of the drive wheels which are detected by rotary encoders 206L and 206R coincide with the values calculated by a calculation unit 209. Measuring wheels 207L and 207R are aligned parallel to a central line 210 of the unmanned vehicle and are symmetrical about a central point 212. The rotational angles are detected by encoders 208L and 208R, respectively, and are transmitted to a calculation unit 209. The calculation unit 209 comprises a microcomputer having a 16-bit CPU. The microcomputer is powered by the batteries 201 and is not connected to any external power source.

The operation time of the microcomputer for the motion control program is about 300 msec. The operation interval of the motion control program is 500 msec. The parameters $\tau$, $k_v$, $k_\omega$, $k_0$, $k_1$ and $k_2$ for the control operation are experimentally obtained so as to smoothly drive the unmanned vehicle. Even when the unmanned vehicle is linearly driven under conditions where the road surface is uneven or electrical characteristics of the motors vary, an error corresponding to a deviation from the preset path and caused by such conditions is roughly a few centimeters. In this case, the unmanned vehicle can be driven without zig-zag motion. Furthermore, the unmanned vehicle can be smoothly stopped at a position only several centimeters from the preset stop position.

The operation of the automatic guidance system for an unmanned vehicle according to the present invention is not limited to the types of motion data from the running command system in the above embodiments.

For example, the running command system can provide automatic driving of the unmanned vehicle in such a manner that points along the path are represented by a dot array instead of setting parameters of the path, the dot array data is set in the running control unit so that the dots are defined as sequential destination dots, and the running control unit controls the unmanned vehicle such that the actual position of the unmanned vehicle matches with the target dot. When the path is irregularly curved it cannot be represented by several parameters as in the embodiments described above. In this case, it is more suitable to represent the path with the dot array. The arrangement of the running control unit which corresponds to a motion data parameter ($x_i$, $y_i$, $\theta_i$, $\bar{v}$) is the same as that for any embodiment described above. The same stopping operation as in the above embodiments can be applied to cause the unmanned vehicle to move to the target dot at a predetermined moving velocity under the control of the running command system. As a result, the unmanned vehicle can be driven along a winding road.

Figure 14:
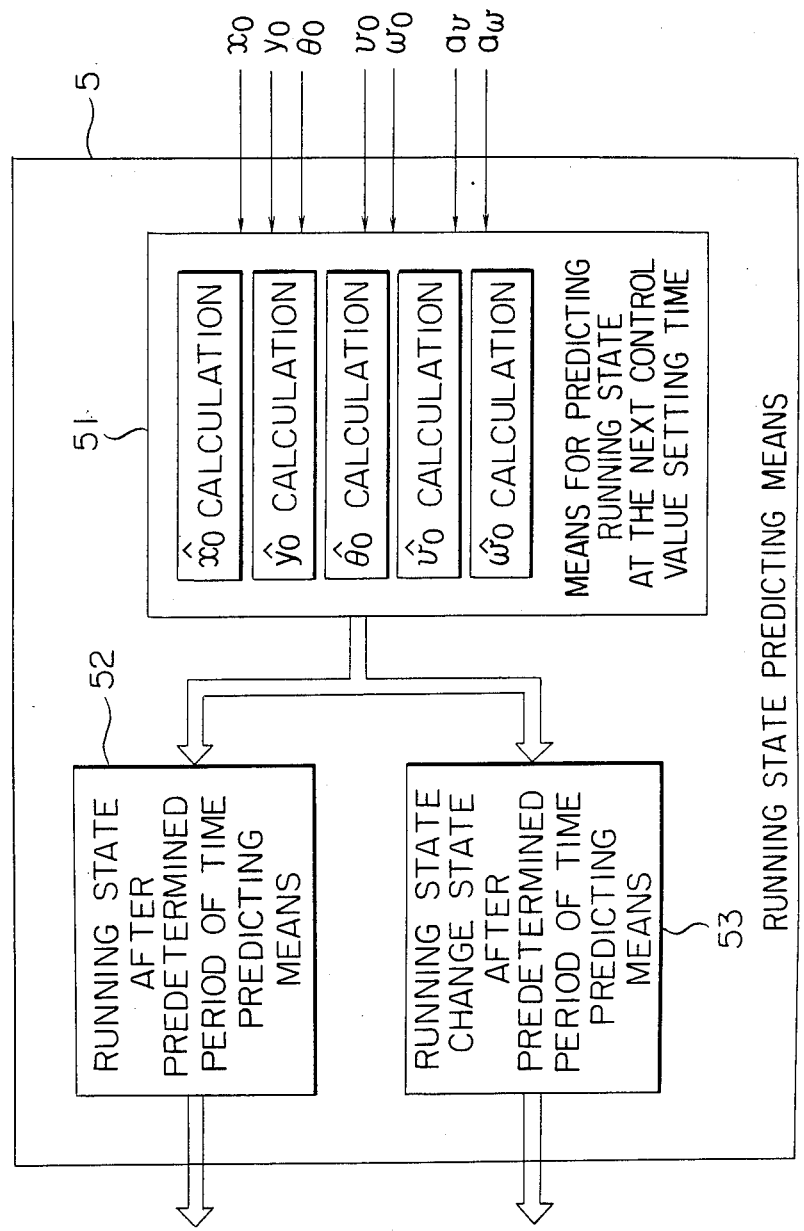
FIG. 14 is a block diagram showing a modification of the running state predicting means shown in FIG. 11.

When prediction precision is poor, instead of expected decrease in the running error, the running error is often increased due to inaccurate prediction. In order to prevent such an occurrence more accurate prediction than the running state prediction in the above embodiments is performed to improve running control operation. In other words, the time required for running control calculations is the most important factor in influencing precision of the running state prediction. During this calculation period, the moving state at the time when the control values are preset differs from the running state at the time when the calculations are started. In order to correct this difference, the running state prediction function is arranged, as shown in FIG. 14. The running state prediction correction section comprises a means 51 for predicting the running state at the next control value setting time in accordance with the running state at the calculation start time and the current control values set in the drive unit, and means 52 and 53 for predicting a running state after the predetermined period of time for the predicted running state and the change rate of the running state after the predetermined period of time. With this arrangement, the error of the control value effect prediction which is caused by the calculation delay can be corrected to improve the control performance.

Figures 15, 15B:
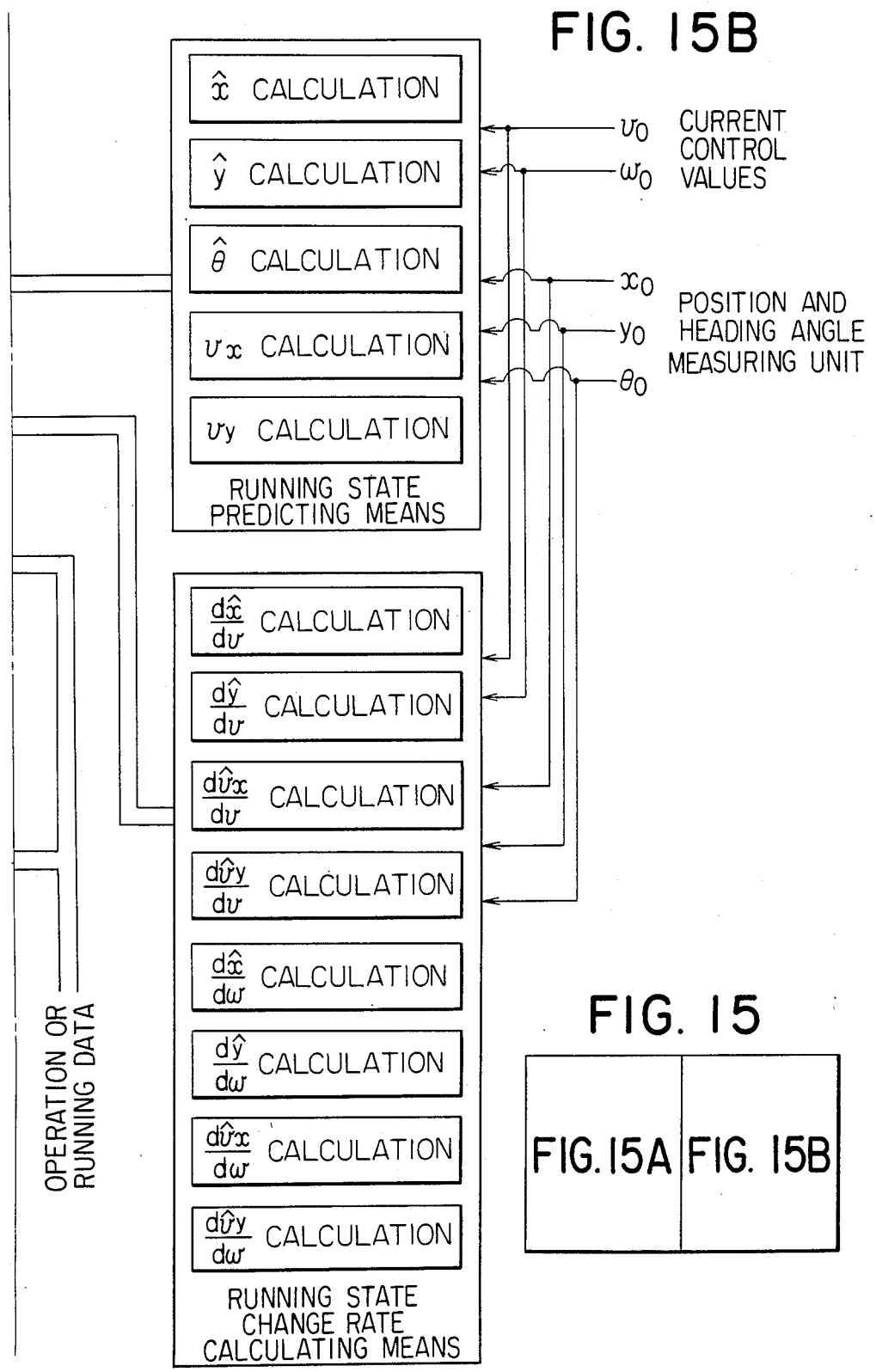
FIGS. 15, 15A and 15B are diagrams showing function blocks of the microcomputer for using a moving velocity and an azimuth angular velocity as control values.
Figure 15A:
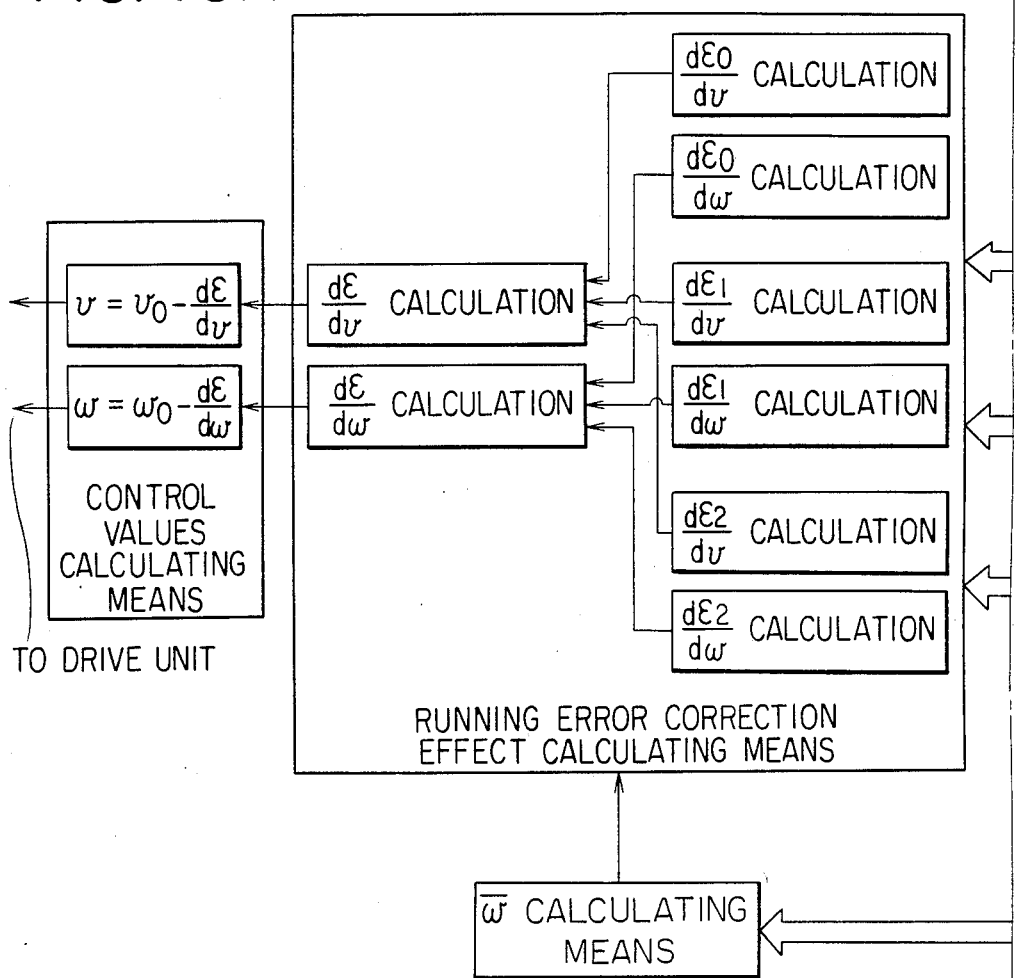

In the above embodiments, the moving acceleration and the azimuth angular acceleration are used as the control values. However, the moving velocity and the azimuth angular velocity can be used as the control values in order to simplify the calculations. In this case, the functional elements constituting the running control unit are illustrated in FIG. 15. The moving state predicting and running state change rate predicting means calculates the state values and the state value change rates in accordance with the moving velocity and the azimuth angular velocity. At the same time, the running error correction effect calculating means calculates the correction effect of the running error caused by changes in moving velocity and azimuth angular velocity.

With the above arrangement, as compared with the case wherein the moving acceleration and the azimuth angular acceleration are used as the control values, the moving velocity and the azimuth angular velocity change discretely, so that the unmanned vehicle is not moved with sufficient smoothness. However, the calculations can be simply performed, thereby allowing use of a basic microcomputer to perform running control.

Unlike the running error defined in the above embodiments, another definition of the running error can be used to perform running control.

In the above embodiments, the running state prediction and the running state change rate prediction are performed under conditions wherein the moving and azimuth angle accelerations as control values are set at zero. However, the assumed control values need not be set at zero. The above means can be arranged to predict corresponding values by using any control values. The predicting means are arranged as described above, and the optimal control values for minimizing the running error are calculated by the control value calculating means in accordance with the assumed control values. The resultant control values are calculated again as the control values assumed for the predicting means, thereby obtaining the optimal control values to further decrease the running value error. A high speed calculation unit repeatedly calculates this operation to set the optimal control values in the drive unit. Since the running control unit is arranged in the manner described above, the optimal control values which minimize the running error can be obtained, thereby providing better running control.

What is claimed is:

1. An automatic guidance system for an unmanned vehicle so as to guide the unmanned vehicle to a destination by executing one of a number of operation sequences, including travel along a preset course, turning at a point and stopping at a point, comprising:

running command means for generating or running data which determines operation of the unmanned vehicle:

position and heading angle measuring means for detecting current running state values such as a position and a heading angle of the unmanned vehicle and generating running state data;

driving means for running and turning the unmanned vehicle; and running controlling means having running state value predicting means, connected to said position and heading angle measuring means, for calculating state values representing the running state including at least a running position after a predetermined period of time in accordance with a drive value of said driving means determined by the given control value and the changes of running state data of the unmanned vehicle determined by the drive value from said driving means, and control value calculating means, connected to said running state predicting means, said running command means and said driving means, for calculating the control value set in said driving means in accordance with the running data and the predicted state value of the unmanned vehicle, whereby a running state of the unmanned vehicle after the predetermined period of time is predicted, and the unmanned vehicle is accurately guided along the preset path in such a manner that the predicted running state of the unmanned vehicle after the predetermined period of time corresponds to an operation of the unmanned vehicle determined by the running data generated by the running command means.

2. A system according to claim 1, wherein said running command means comprises:

running data memory means for storing running data such as running path data and position data;

running state comparing means for comparing the running data stored in said running data memory means and a running state defined by moving velocity information and azimuth angular velocity information from said driving means and the position and heading angle information from said position and heading angle measuring means; and running data setting means, connected to said running data memory means and running state comparing means, for selecting running data from said memory means and setting the selected running data in said running controlling means, the selected running data being used to perform switching of the running path of the unmanned vehicle and switching between stopping and traveling.

3. A system according to claim 1, wherein said position and heading angle measuring means comprises wheel rotational angle detecting means for detecting motion of the unmanned vehicle with respect to a road surface, and position and heading angle calculating means, connected to said wheel rotational angle detecting means, for calculating a position and a heading angle of the unmanned vehicle in accordance with the detected rotation speed.

4. A system according to claim 1, wherein said driving means comprises drive wheel rotational angle calculating means for calculating rotation speeds of right and left drive wheels of the unmanned vehicle in accordance with the moving acceleration and the azimuth angular acceleration which are set by said running controlling means.

5. A system according to claim 1, wherein said running state predicting means comprises means for calculating, as predicted state values representing the running state after the predetermined period of time, a moving velocity v, an azimuth angular velocity $\omega$, a position (x,y), a heading angle $\theta$, an x-axis moving velocity component $v_x$ and a y-axis moving velocity component $v_y$ in accordance with the moving velocity information and the azimuth angular velocity information which are given from said driving means and the position and heading angle information which is supplied from said position and heading angle measuring means and which is expressed in a reference coordinate system.

6. A system according to claim 1, wherein said running state predicting means comprises:

drive value predicting means for predicting drive values of the unmanned vehicle which represent running and turning after the predetermined period of time in correspondence with assumed values as the control values set in said driving means according to a drive value of said driving means determined by the given control value, using the current running state values of the unmanned vehicle which is obtained from said position and heading angle measuring means; and position and heading angle predicting means, for predicting a position and a heading angle of the unmanned vehicle after the predetermined period of time in response to the control values which are set in said driving means, by calculating the changes in the position and the heading angle of the unmannned vehicle in the predetermined period of time, which are derived from the said predicting drive values from said drive value predicting means, and adding the changes in the position and the heading angle to the current position and heading angle information which are supplied from said position and heading angle measuring means.

7. A system according to claim 1, wherein said running state predicting means comprises means for predicting a running state at a next control value setting time in accordance with a running state at a calculation start time and the current control values set in said driving means, and means for predicting a running state after the predetermined period of time of the predicted running state and a change rate of the predicted running state in accordance with the drive values, whereby an error caused by a calculation time delay for control value effect prediction is corrected.

8. A system according to claim 1, wherein said running controlling means comprises evaluation function calculating means for calculating an evaluation function value from the running data as parameters which represents the operation and which are given from said running command means and the predicted running state values from said running state predicting means in accordance with the evaluation function solely determined in accordance with the state values representing the running state and the parameters, said evaluation function calculating means being arranged to numerically evaluate whether or not the running state predicted by said running state predicting means corresponds to a state designated by said running command means.

9. A system according to claim 8, wherein the evaluation function value calculated by said evaluation function calculating means comprises a running error including a position error representing a deviation of the unmanned vehicle from the preset path represented by the running data from the running command means, the position error being obtained from the state values.

10. A system according to claim 9, wherein said assumed control value generating means comprises a random number generator having a limited range of random numbers.

11. A system according to claim 8, wherein said running controlling means comprises:
control value calculating means having assumed control value generating means for generating a plurality of assumed control values and control value setting means for setting the control value in said driving means; and
correction effect calculating means, connected to said evaluation effect calculating means, for calculating a magnitude of a change in an evaluation function value which is caused by a change in a control value, by comparing the differences in assumed control values, generated by said assumed control value generating means, with the change of the corresponding evaluation function value from said evaluation function calculating means, whereby said control value setting means sets the control value in said driving means in accordance with the magnitude of the change in the evaluation function value from said correction effect calculating means.

12. A system according to claim 1, wherein the control value calculating means comprises:
assumed control value generating means for generating a plurality of assumed control values;
evaluation value comparing means for comparing, evaluation function values calculated by said evaluation function calculating means for the state values representing the running states after a predetermined period, the running states being predicated for all assumed control values, with a minimum value,
minimum value memory means connected to said evaluation value comparing means for memorizing the minimum value of the compared values from the evaluation value comparing means and for supplying said minimum value to the evaluation value comparing means; and
control value setting means for determining the control value to be set in said driving means in accordance with comparison results of said evaluation value comparing means.

13. A system according to claim 1, wherein said running controlling means comprises running state change rate calculating means for calculating a change in the state values upon slight changing of the control values which are to be set in said driving means as a function of the current running state values which are obtained from said position and heading angle measuring means, in relation to a drive value of said driving means determined by the given control value and the rate change of running state data of the unmannned vehicle determined by the drive value from said driving means, whereby the control value is set in said driving means in accordance with a change rate value and prediction results of the running state.

14. A system according to claim 13, wherein said running state change rate calculating means calculates change rates representing changes in predicted state values from said running state predicting means in accordance with changes in moving acceleration and azimuth angular acceleration.

15. A system according to claim 13, wherein the evaluation function change rate calculating means is connected to an input of said control value calculating means, said evaluation function change rate calculating means calculating a change rate of the evaluation function when the control value changes by the parameters representing the operation from said running command means, the prediction result of the running state from said running state predicting means and the predicted change rate from said running state change rate calculating means when the evaluation function is predetermined solely by the state values representing the running state and the parameters representing the operation, and said control value calculating means determines the control value in accordance with the change rate value of the evaluation function from said evaluation function change rate calculating means and sets the control value in said driving means.

16. A system according to claim 15, wherein the running error including the magnitude of the deviation from the preset running path which is obtained by the state values representing the running state and the parameters representing the operation is determined as the evaluation function, said evaluation function change rate calculating means is constituted as running error correction effect calculating means to calculate the change rate, i.e., a running error correction effect, of the running error with respect to the change in the control value, and said control value calculating means sets the control value in said driving means in accordance with the magnitude of the running error correction effect obtained by said running error correction effect calculating means.

17. A system according to claim 16, wherein said running error correction effect calculating means comprises:
   velocity error change rate calculating means for calculating differential coefficients of the moving velocity error and the azimuth angular velocity error with respect to the moving acceleration, respectively;
   position error change rate calculating means for performing differential operations of a path error from a moving path as a function of the moving acceleration and the azimuth angular acceleration, the position error representing a deviation from the running path when the unmanned vehicle is being moved and a distance to a predetermined stopping point when the unmanned vehicle is stopped;
   heading angle error change rate calculating means for calculating differential coefficients of the heading angle error with respect to the moving acceleration and the azimuth angular acceleration respectively, the heading angle error representing a component of the velocity of the moving vehicle in a direction perpendicular to the running path of the vehicle when the operation of the vehicle is running along a path/and the deviation from a predetermined heading angle when the operation of the unmanned vehicle is stopping at a point; and
   running error change rate calculating means for calculating a running error obtained such that outputs from said velocity error change rate calculating means, said path error change rate calculating means and said heading angle error change rate calculating means are multiplied with a given coefficient and resultant products are added to each other.

18. A system according to claim 13, wherein said running error correction effect calcuating means calculates ratios of the running error by using the predicted state values calculated by said running state predicting means, the state value changing rates calculated by said running state change rate calculating means, and parameters of the motion data set by said running command means.

19. A system according to claim 1, wherein said control value calculating means comprises means for calculating a preset value of the moving acceleration so as to decrease the running error in accordance with the running error change rates calculated by said running error correction effect calculating means, and means for calculating a preset value of the azimuth angular acceleration for decreasing the running error in accordance with the running error change rates calculated by said running error correction effect calculating means.

20. A system according to claim 19, wherein the control value comprises the moving velocity and the azimuth angular velocity.

* * * * *

UNITED STATES PATENT AND TRADEMARK OFFICE
CERTIFICATE OF CORRECTION

PATENT NO. : 4,700,302

DATED : October 13, 1987

INVENTOR(S) : Arakawa et al.

It is certified that error appears in the above—identified patent and that said Letters Patent is hereby corrected as shown below:

The name of the second-listed inventor is:

-- Gunji Sugimoto --.

Signed and Sealed this

Thirty-first Day of January, 1989

Attest:

DONALD J. QUIGG

Attesting Officer

Commissioner of Patents and Trademarks